(12) United States Patent
Hoffmann et al.

(10) Patent No.: US 9,085,334 B2
(45) Date of Patent: Jul. 21, 2015

(54) ELECTRIC-POWERED SELF-BALANCING UNICYCLE

(71) Applicant: Ryno Motors, Inc., Beaverton, OR (US)

(72) Inventors: Christopher J. Hoffmann, Portland, OR (US); Anthony J. Ozrelic, Bend, OR (US)

(73) Assignee: RYNO Motors, Inc., Beaverton, OR (US)

( * ) Notice: Subject to any disclaimer, the term of this patent is extended or adjusted under 35 U.S.C. 154(b) by 0 days.

(21) Appl. No.: 13/973,925

(22) Filed: Aug. 22, 2013

(65) Prior Publication Data

US 2014/0058600 A1     Feb. 27, 2014

Related U.S. Application Data

(60) Provisional application No. 61/692,131, filed on Aug. 22, 2012, provisional application No. 61/709,924, filed on Oct. 4, 2012, provisional application No. 61/817,817, filed on Apr. 30, 2013, provisional application No. 61/863,064, filed on Aug. 7, 2013.

(51) Int. Cl.
*B62K 3/00* (2006.01)
*B62K 1/00* (2006.01)

(52) U.S. Cl.
CPC .. *B62K 3/007* (2013.01); *B62K 1/00* (2013.01)

(58) Field of Classification Search
None
See application file for complete search history.

(56) References Cited

U.S. PATENT DOCUMENTS

| | | |
|---|---|---|
| 660,835 A | 10/1900 | Boes |
| 734,109 A | 7/1903 | Tolche |
| 1,585,258 A | 5/1926 | Moore |
| 2,802,300 A | 8/1957 | Rogers |
| 2,971,773 A | 2/1961 | McKissick |
| 3,083,036 A | 3/1963 | Cornell, III et al. |
| 3,260,324 A | 7/1966 | Suarez |
| 3,399,742 A | 9/1968 | Malick |
| 3,860,264 A | 1/1975 | Douglas et al. |
| 4,062,558 A | 12/1977 | Wasserman |
| 4,109,741 A | 8/1978 | Gabriel |
| 4,241,931 A | 12/1980 | Healy |
| 4,315,167 A | 2/1982 | Pelc |
| 4,324,413 A | 4/1982 | Bensette et al. |
| D273,287 S | 4/1984 | Evans |
| 4,498,036 A | 2/1985 | Salemka |

(Continued)

FOREIGN PATENT DOCUMENTS

| | | |
|---|---|---|
| CN | 2302942 Y | 1/1999 |
| CN | 201890317 U | 7/2011 |

(Continued)

OTHER PUBLICATIONS

Ryno Motors UBAST Test Ride off the Youtube.com webpage. Uploaded on Sep. 27, 2010. Accessed on Jan. 27, 2015 at https://www.youtube.com/watch?v=_eVbdbMPdq4.*

(Continued)

*Primary Examiner* — John R Olszewski
*Assistant Examiner* — Jess Whittington
(74) *Attorney, Agent, or Firm* — Kolisch Hartwell, P.C.

(57) ABSTRACT

An electric powered self-balancing unicycle may include a single wheel assembly having a drive system substantially contained within the wheel, a frame and handlebars including a four-bar linkage mechanism pivotably connected to the wheel assembly by a fork.

12 Claims, 10 Drawing Sheets

(56) References Cited

U.S. PATENT DOCUMENTS

| | | | |
|---|---|---|---|
| 4,549,123 A | 10/1985 | Hägglund et al. | |
| 4,657,272 A | 4/1987 | Davenport | |
| 4,733,149 A | 3/1988 | Culberson | |
| 4,912,381 A | 3/1990 | Culberson | |
| 5,002,931 A | 3/1991 | Rivier et al. | |
| 5,166,679 A | 11/1992 | Vranish et al. | |
| 5,314,034 A * | 5/1994 | Chittal | 180/21 |
| 5,371,670 A | 12/1994 | Lurie | |
| 5,442,347 A | 8/1995 | Vranish | |
| 5,550,701 A | 8/1996 | Nadd et al. | |
| 5,710,504 A | 1/1998 | Pascual et al. | |
| 5,719,788 A | 2/1998 | Seborg et al. | |
| 5,940,963 A | 8/1999 | Tolmie et al. | |
| 5,971,091 A | 10/1999 | Kamen et al. | |
| 6,081,751 A | 6/2000 | Luo et al. | |
| 6,167,774 B1 * | 1/2001 | Gagnon et al. | 74/473.12 |
| 6,268,794 B1 * | 7/2001 | Tzanev | 340/475 |
| 6,302,230 B1 | 10/2001 | Kamen et al. | |
| 6,367,817 B1 | 4/2002 | Kamen et al. | |
| 6,431,301 B1 | 8/2002 | Forbes | |
| 6,508,431 B1 | 1/2003 | Gavit | |
| 6,561,294 B1 | 5/2003 | Kamen et al. | |
| 6,561,594 B1 | 5/2003 | Lin | |
| D489,027 S | 4/2004 | Waters | |
| D489,029 S | 4/2004 | Waters | |
| 6,722,608 B1 | 4/2004 | Gavit et al. | |
| D489,300 S | 5/2004 | Chang et al. | |
| D493,127 S | 7/2004 | Waters et al. | |
| D493,128 S | 7/2004 | Waters et al. | |
| D493,129 S | 7/2004 | Waters et al. | |
| D493,392 S | 7/2004 | Waters et al. | |
| D493,747 S | 8/2004 | Waters et al. | |
| 6,804,080 B1 | 10/2004 | Gavit et al. | |
| 6,814,324 B2 | 11/2004 | Gavit et al. | |
| 6,870,345 B1 | 3/2005 | Wand | |
| 6,876,512 B2 | 4/2005 | Gavit et al. | |
| D505,363 S * | 5/2005 | Aube et al. | D12/107 |
| 6,889,927 B2 | 5/2005 | Gavit et al. | |
| 6,906,890 B2 | 6/2005 | Gavit et al. | |
| 6,909,581 B2 | 6/2005 | Gavit et al. | |
| 7,004,271 B1 | 2/2006 | Kamen et al. | |
| 7,099,120 B2 | 8/2006 | Gavit et al. | |
| D528,468 S | 9/2006 | Arling et al. | |
| D551,592 S | 9/2007 | Chang et al. | |
| D551,722 S | 9/2007 | Chang et al. | |
| 7,344,101 B2 | 3/2008 | Gavit et al. | |
| 7,461,714 B2 | 12/2008 | Holland | |
| 7,537,228 B2 | 5/2009 | Shimizu et al. | |
| 7,572,998 B2 | 8/2009 | Mohamed et al. | |
| 7,633,252 B2 | 12/2009 | Maue et al. | |
| 7,740,099 B2 | 6/2010 | Field et al. | |
| 7,757,794 B2 | 7/2010 | Heinzmann et al. | |
| D626,892 S | 11/2010 | Shin | |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 8,146,696 B2 | 4/2012 | Kaufman | |
| 8,381,847 B2 | 2/2013 | Polutnik | |
| D685,295 S | 7/2013 | Mori et al. | |
| 8,800,697 B2 | 8/2014 | Hoffmann et al. | |
| 2004/0150187 A1 | 8/2004 | Chen | |
| 2004/0218308 A1 | 11/2004 | Gavit et al. | |
| 2006/0032960 A1 | 2/2006 | Gavit et al. | |
| 2006/0279057 A1 | 12/2006 | Shimizu et al. | |
| 2007/0158117 A1 | 7/2007 | Alexander | |
| 2007/0187166 A1 * | 8/2007 | Kamen et al. | 180/282 |
| 2007/0296170 A1 * | 12/2007 | Field et al. | 280/47.131 |
| 2008/0039990 A1 | 2/2008 | Steven et al. | |
| 2008/0161990 A1 | 7/2008 | Gansler | |
| 2008/0237484 A1 | 10/2008 | Morfill et al. | |
| 2009/0055033 A1 | 2/2009 | Gansler et al. | |
| 2009/0099762 A1 | 4/2009 | Heinzmann et al. | |
| 2009/0105908 A1 | 4/2009 | Casey et al. | |
| 2010/0030441 A1 * | 2/2010 | Kosaka | 701/70 |
| 2010/0051371 A1 | 3/2010 | Kaufman | |
| 2010/0114468 A1 | 5/2010 | Field et al. | |
| 2010/0207564 A1 | 8/2010 | Robinson | |
| 2010/0222994 A1 | 9/2010 | Field et al. | |
| 2010/0252345 A1 * | 10/2010 | Hoshino | 180/65.31 |
| 2011/0056757 A1 * | 3/2011 | Polutnik | 180/65.51 |
| 2011/0067937 A1 * | 3/2011 | Gomi et al. | 180/21 |
| 2011/0191013 A1 * | 8/2011 | Leeser | 701/124 |
| 2011/0209929 A1 | 9/2011 | Heinzmann et al. | |
| 2011/0213522 A1 | 9/2011 | Stevens et al. | |
| 2011/0220427 A1 * | 9/2011 | Chen | 180/21 |
| 2012/0217072 A1 | 8/2012 | Hoffmann et al. | |
| 2014/0196962 A1 | 7/2014 | Hoffmann et al. | |

FOREIGN PATENT DOCUMENTS

| | | |
|---|---|---|
| CN | 102139733 B | 11/2012 |
| DE | 97326 | 10/1897 |
| DE | 202008010306 U1 | 10/2008 |
| EP | 0203550 | 12/1986 |
| EP | 1174334 A2 | 1/2002 |
| EP | 2105376 A1 | 9/2009 |
| EP | 2409905 | 1/2012 |
| JP | 48033485 U | 4/1973 |
| JP | 56089788 U | 7/1981 |
| JP | 2001-030972 | 2/2001 |
| TW | 298190 | 6/1985 |
| TW | M403480 | 5/2011 |
| TW | M424290 | 3/2012 |
| TW | 201213188 A1 | 4/2012 |
| WO | 0115962 A1 | 3/2001 |

OTHER PUBLICATIONS

Caldecott et al., "MICYCLE", Final Report for MECH ENG 4135: Honours Project 980 at The University of Adelaide, Faculty of Engineering, Computer and Mathematical Sciences, School of Mechanical Engineering, Oct. 22, 2010, 387 pages, Australia.

Professor Klaus Hofer from the University of Applied Sciences in Bielefeld, Germany, "Electric Vehicle on one Wheel", research paper published by Vehicle Power and Propulsion, pp. 517-521, presented Sep. 7-9, 2005, at the 2005 IEEE Conference.

Professor Klaus Hofer from the University of Applied Sciences in Bielefeld, Germany, "Observer-Based Drive-Control for Self-Balanced Vehicles", research paper published by IEEE Industrial Electronics, IECON 2006—32nd Annual Conference, pp. 3951-3956, presented Nov. 10, 2006, at the 2006 IEEE Conference.

Klaus Hofer, "Electric Drive System For Self-Balanced Vehicles", research paper published by Industry Applications, 2010 9th IEEE/IAS International Conference, presented Nov. 8-10, 2010, at the 2010 IEEE Conference.

Huang et al., "The Development of Self-Balancing Controller for One-Wheeled Vehicles", article published online at http://www.scirp.org/journal/eng/ by Scientific Research, Apr. 2010, pp. 212-219.

Kadis et al. of The University of Adelaide, Australia, "Modelling, simulation and control of an electric unicycle", research paper published by ARAA, 2010, presented Dec. 1-3, 2010, at the 2010 ACRA Conference on Robotics & Automation in Brisbane, Australia.

Lauwers et al. from the Robotics Institute of Carnegie Mellon University, Pittsburgh, Pennsylvania, "A Dynamically Stable Single-Wheeled Mobile Robot with Inverse Mouse-Ball Drive", research paper published by Robotics and Automation, 2006, pp. 2884-2889, presented May 2006, at the IEEE Conference on Robotics and Automation in Orlando, Florida, USA.

Nagarajan et al., "State Transition, Balancing, Station Keeping, and Yaw Control for a Dynamically Stable Single Spherical Wheel Mobile Robot", research paper published by Robotics and Automation, May 2009, pp. 998-1003, presented May 12-17, 2009, at the 2009 IEEE International Conference on Robotics & Automation in Kobe, Japan.

Nakajima et al. from the Intelligent Robot Laboratory, Institute of Information Science and Electronics, University of Tsukuba, Kanagawa, Japan, "A Development of a New Mechanism of an

(56) References Cited

OTHER PUBLICATIONS

Autonomous Vehicle", research paper published by Intelligent Robots and Systems, 1997, pp. 906-912, presented Sep. 7-11, 1997, at the IEE/RSJ International Conference.

Sheng et al., "Postural Stability of a Human Riding a Unicycle and Its Emulation by a Robot", published by Robotics and Automation, Oct. 1997, vol. 13, No. 5, pp. 709-720.

Aleksander Polutnik; "eniCycle Electric Unicycle" brochure; circa before Aug. 31, 2009; 4 pages.

Author Unknown; Motor Wheel photograph; circa 1931; 1 page.

Author Unknown; Motor Unicycle photograph; circa before Aug. 31, 2009; 1 page.

Author Unknown; one-wheeled motorcycle, photograph; circa before Aug. 31, 2009; 1 page.

Syd Mead Unicycle, photograph; circa before Aug. 31, 2009; 1 page.

World International Property Organization (Blaine R. Copenheaver, Authorized Officer); International Search Report and Written Opinion for PCT/US2013/056282; Jan. 10, 2014.

Nov. 24, 2014, Office Action from US Patent and Trademark Office, in U.S. Appl. No. 29/453,578, which is another application of applicant, Ryno Motors, Inc.

\* cited by examiner

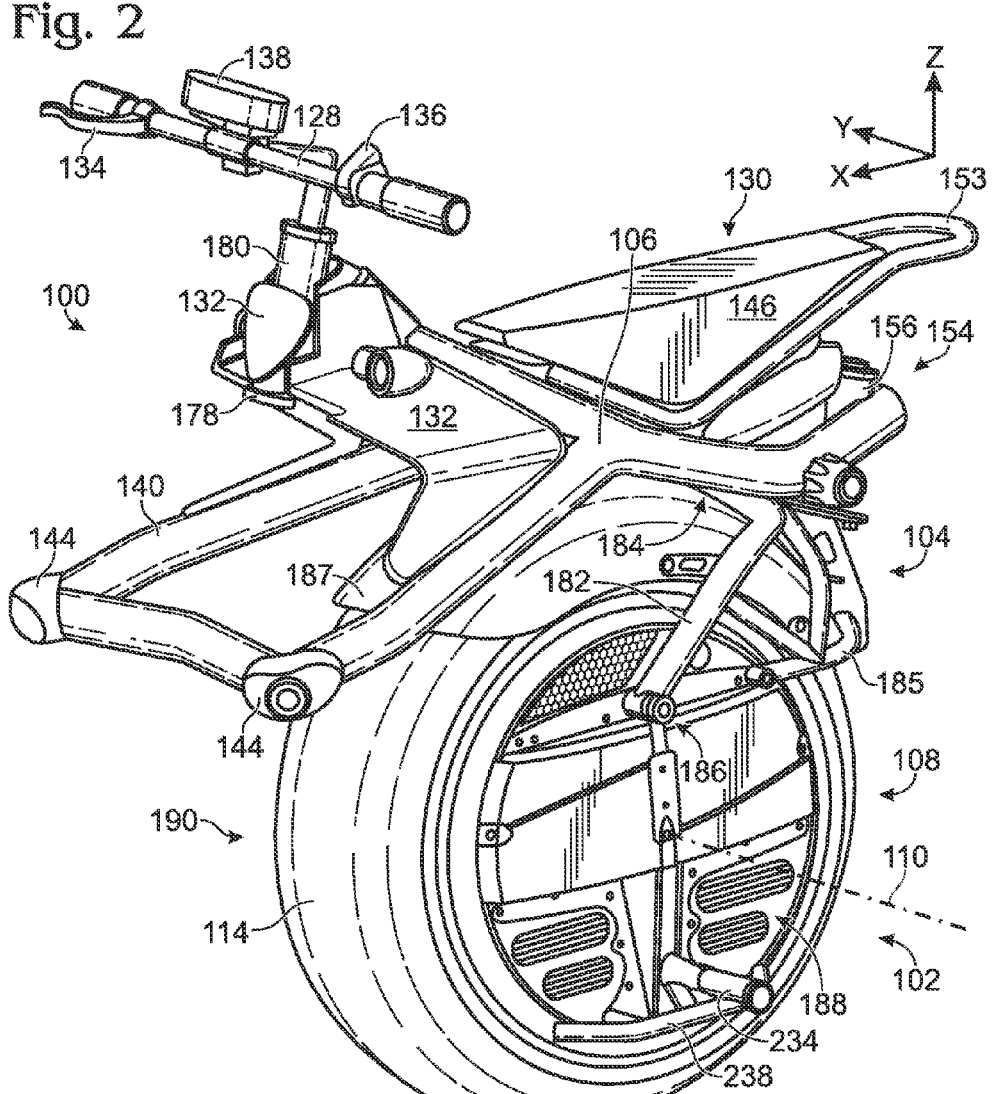
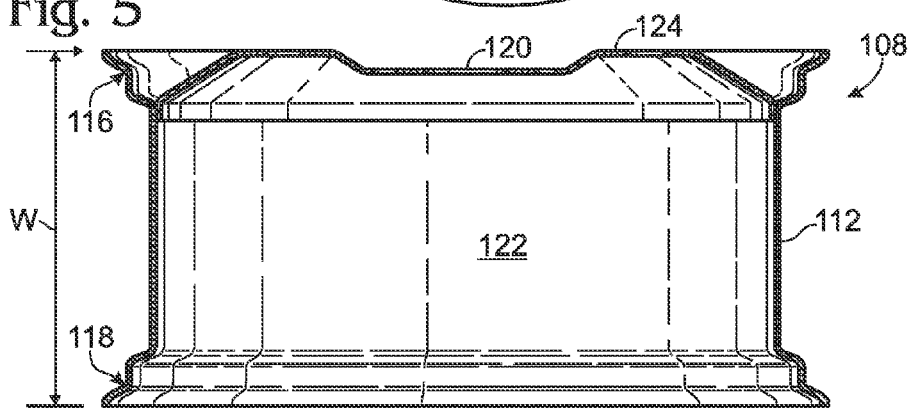

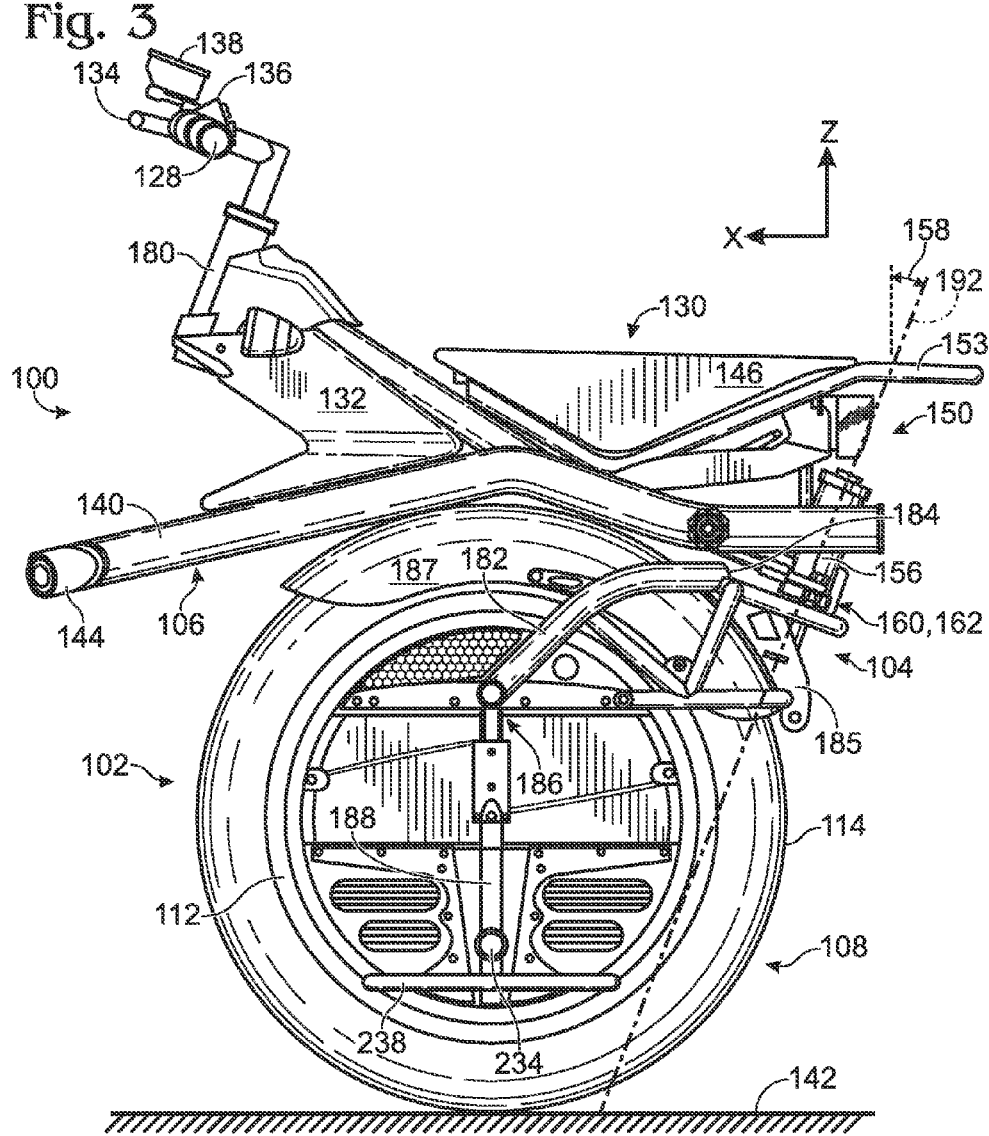
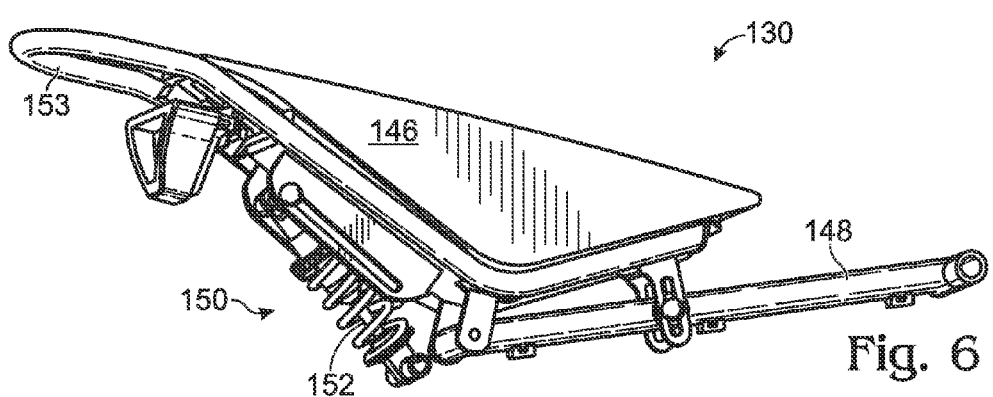

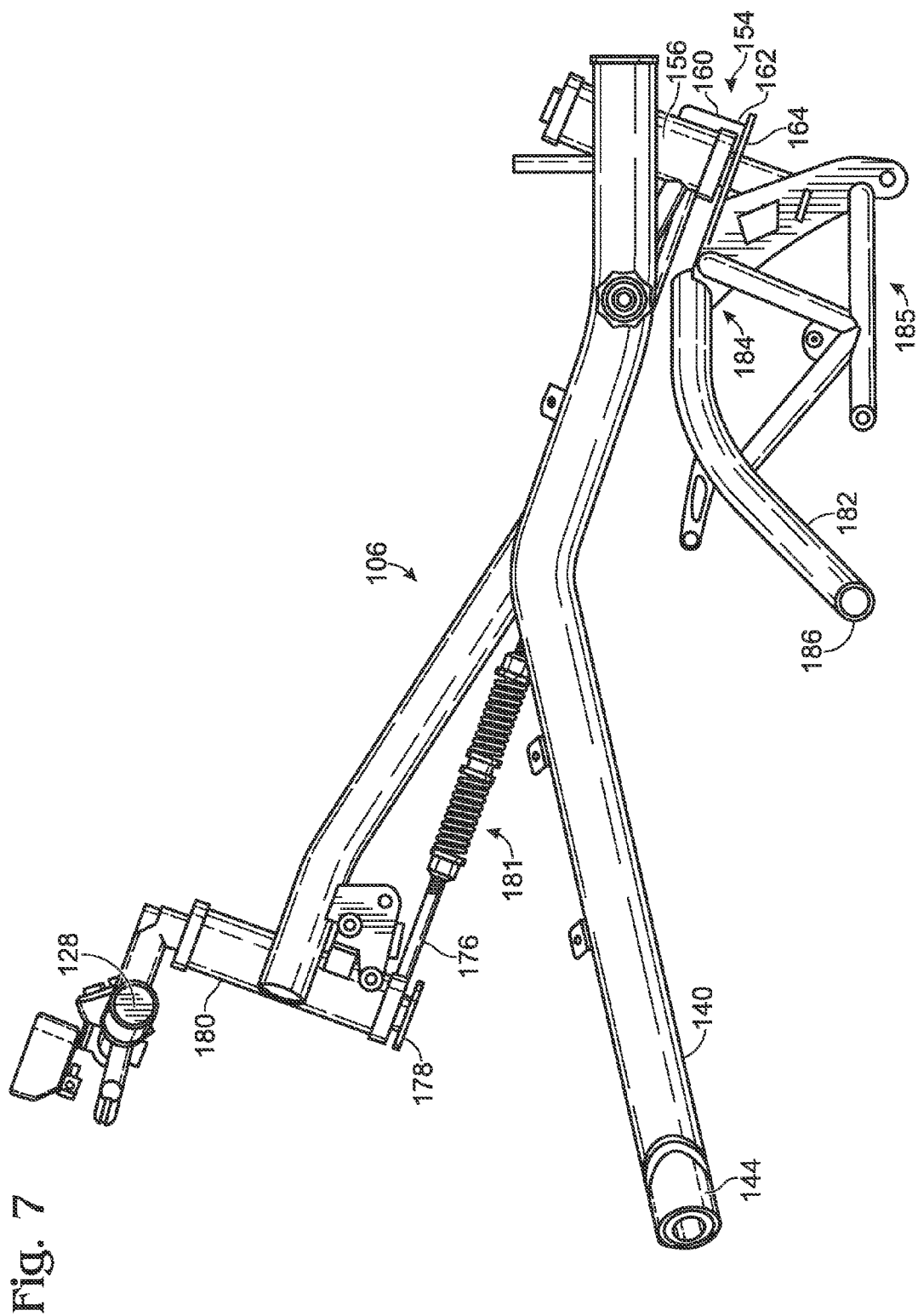

ELECTRIC-POWERED SELF-BALANCING UNICYCLE

CROSS-REFERENCE TO RELATED APPLICATIONS

This application claims priority to U.S. Provisional Patent Application Ser. No. 61/692,131, filed Aug. 22, 2012, U.S. Provisional Patent Application Ser. No. 61/709,924, filed Oct. 4, 2012, U.S. Provisional Patent Application Ser. No. 61/817,817, filed Apr. 30, 2013 and U.S. Provisional Patent Application Ser. No. 61/863,064, filed Aug. 7, 2013, all of which are hereby incorporated herein by reference in their entireties for all purposes.

INTRODUCTION

The need for new forms of transportation is ongoing in modern societies worldwide. One challenge in designing vehicles for transportation involves balancing energy efficiency, good usability, and user enjoyment.

BRIEF DESCRIPTION OF THE DRAWINGS

FIG. 2 is an isometric view of an embodiment of an electric-powered self-balancing unicycle.

FIG. 3 is a side elevation view of the powered unicycle of FIG. 1.

FIG. 5 is a sectional view of the wheel of FIG. 4 taken at line 5-5.

FIG. 6 is an isometric view of an embodiment of a seat portion suitable for use on a powered unicycle.

FIG. 7 is a side elevation view of a frame portion of the powered unicycle of FIG. 2.

DETAILED DESCRIPTION

An electric-powered self-balancing unicycle is described and illustrated in the present disclosure. Generally, an electric-powered self-balancing unicycle may include a single wheel assembly connected to a frame, the frame supporting a seat and handlebar for a human rider. In some examples, a unicycle may be self-balancing with respect to an axis parallel to the axis of rotation of the wheel. The terms "bike," "cycle," "unicycle," and "vehicle" may all be used interchangeably herein to indicate a one-wheeled vehicle constructed according to the present disclosure. Electric-powered unicycle devices and systems are described in U.S. Patent Publication No. 2012/0217072, which is hereby incorporated by reference in its entirety for all purposes.

Unless otherwise specified, a powered unicycle according to the present disclosure, and/or its various components, may but are not required to contain at least one of the structure, components, functionality, and/or variations described, illustrated, and/or incorporated herein. Furthermore, the structures, components, functionalities, and/or variations described, illustrated, and/or incorporated herein in connection with the unicycle may, but are not required to, be included in other similar apparatuses.

Figure 1:
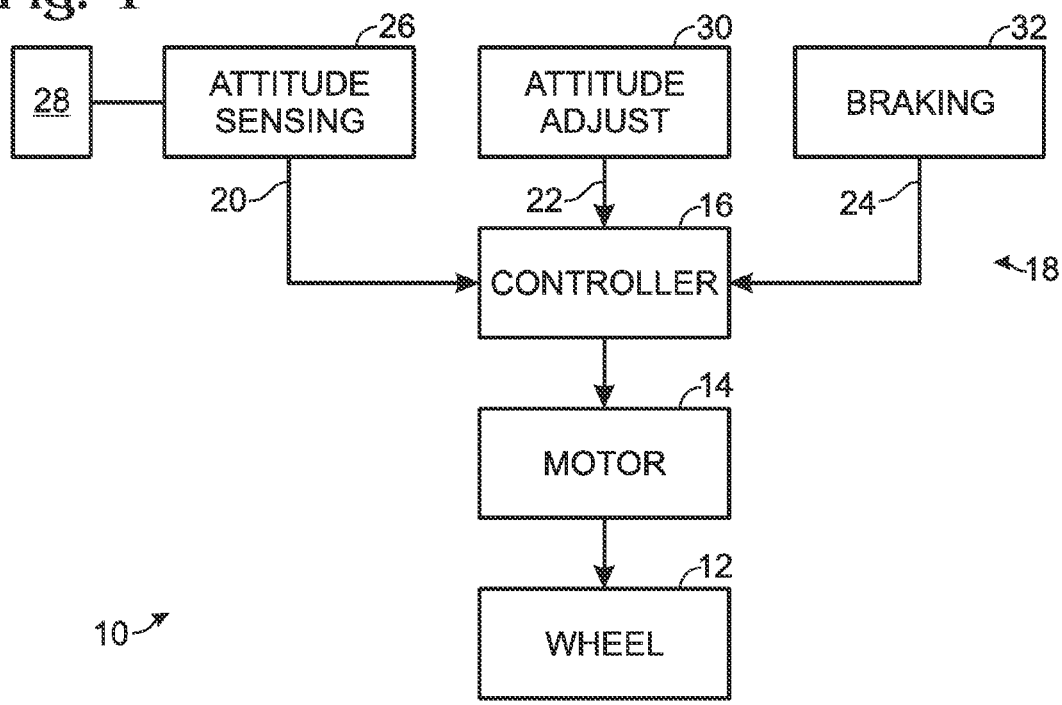
FIG. 1 is a block diagram of an embodiment of a powered unicycle showing the relationship between certain major components.

FIG. 1 shows a schematic diagram of certain main components of a powered unicycle 10 constructed according to the present disclosure. Unicycle 10 may include any suitable single-wheeled vehicle configured with a drive system contained in the wheel and a multi-input, auto-balancing control system controlling the drive system. In the example depicted, unicycle 10 may include a wheel assembly 12 driven by one or more motors 14, which in turn are controlled by a controller 16 receiving one or more inputs 18.

Wheel assembly 12 may include any suitable single-wheeled structure configured to contain a drive system substantially within a wheel. Examples of such wheel assemblies are described in further detail below. Motor or motors 14 may include any suitable motor and/or other primary mover configured to rotate the wheel of wheel assembly 12. For example, motor 14 may include a battery-powered electric motor operatively connected to wheel assembly 12 such that rotation of the motor causes rotation of the wheel. Gearing and timing systems and the like may be included in a drive system to facilitate driving of the wheel by motor 14. These systems are also described in further detail below.

Controller 16 may include any suitable electronic controller configured to automatically adjust the speed and/or direction of the wheel based on the states of certain inputs 18. In the example shown in FIG. 1, these inputs 18 may include an attitude input 20, a tilt adjust input 22, and/or a braking input 24. In some examples, controller 16 may include one or more suitable interconnected electronic circuits, memory storage units, motor controllers, and/or control chips configured to carry out software and/or firmware instructions to control motor 14.

Attitude input 20 may include any suitable input configured to correspond to a physical orientation of vehicle 10. Input 20 may be provided by an attitude sensing system 26. Attitude sensing system 26 may include any suitable sensors and/or apparatuses configured to determine an orientation of vehicle 10 in space relative to the center of the earth. For example, attitude sensing system 26 may include one or more sensors 28 for determining pitch, roll, and/or yaw. In these examples, the terms pitch, roll, and yaw are used with their standard meanings. Accordingly, pitch may be defined as pivoting about an axis parallel to an axis of rotation of the wheel, interchangeably termed the "Y" axis. Pitch may also be described as tilting a nose of the vehicle up and down. Roll may be defined as pivoting about an axis parallel to the direction of travel of the vehicle, interchangeably termed the "X" axis. Roll may also be described as tilting the vehicle side to side. Yaw may be defined as pivoting about an axis parallel to a vertical axis through a center of the wheel, interchangeably termed the "Z" axis. Yaw may also be described as rotating the wheel left and right, such as when changing a heading or direction of travel.

In some examples, sensors 28 may include one or more inclinometers, accelerometers, and/or gyroscopes. For example, a roll-type sensor 28 may include an accelerometer in combination with a gyroscope to form an inclinometer configured to sense a roll orientation. Sensors 28 may be affixed to vehicle 10. In some examples, sensors 28 may be collocated with controller 16, such as on a common circuit board or within a common enclosure. In some examples, sensors 28 may be located near a center of gravity of the vehicle, such as within wheel assembly 12. This location may improve accuracy of the sensors with respect to the actual orientation of the vehicle, as opposed to a location farther from the center of gravity.

Controller 16 may be configured to respond to attitude input 20 by automatically adjusting motor 14 to reduce the difference between the measured orientation and a desired orientation. For example, a measured or sensed pitch may be compared to a desired pitch orientation. If the actual pitch is different from the desired pitch, the controller may increase or decrease the speed of motor 14 to reduce the difference. The desired pitch may be referred to as the "zero pitch setpoint" or "zero setpoint."

In some examples, the zero pitch setpoint may be substantially equivalent to a pitch of zero degrees from vertical, which may correspond to a vertical and/or balanced unicycle. In these examples, if the bike tips forward, sensors 28 will detect a pitch indicating that the nose of the bike is tipped downward from horizontal, and pass that pitch to the controller. The controller will compare the sensed pitch to the zero setpoint, and will determine that a difference exists in the forward direction. In some examples, this difference may be positive, while a difference in the tipped-backward direction may be negative.

The controller will then take action to reduce the positive differential or delta between the sensed and desired pitch. In this example, the controller may increase the speed of motor 14 to drive the wheel forward and reduce the forward pitch of the bike. As this action takes effect and the sensed difference approaches zero, the controller may cause acceleration of the motor to level off, and a new equilibrium may be reached at a new higher speed. Similarly, determining that a negative delta exists may cause a reduction in motor speed or may cause a change in motor direction. Accordingly, a user (interchangeably termed a "rider" or an "operator") may control the speed of unicycle 10 by leaning forward or backward to shift a weight distribution and thereby tilt the vehicle, causing the sensed pitch to vary from the zero setpoint and the controller to compensate as discussed above.

In addition to a pitch-type sensor providing an input to allow the controller to compensate for variations from a desired pitch, other sensor inputs may be received by the controller to carry out various other functions. For example, a roll sensor input may be compared to an expected range of roll orientations to determine whether the vehicle has fallen over. In this example, the controller may be configured to shut off power to the vehicle, or to selected subsystems such as the drive system, when such a condition is sensed.

In some examples, the pitch sensor may provide skewed information when certain conditions exist, such as when turning the vehicle creates a significant centrifugal force. In this condition, the skewed pitch sensor may send erroneous information to the controller, leading the controller to incorrectly conclude that a pitch correction is needed. The inventors have determined that the controller may compensate for this previously unexpected skewing condition using an input from the roll sensor. When unicycle 10 turns, the wheel necessarily tilts on the X axis, resulting in a roll value that indicates a turn may be in progress. This information may be used to compensate for the resulting skewed pitch input, for example by offsetting the sensed pitch value by a predetermined or calculated amount.

Controller 16 may receive tilt adjust input 22 from a first user input device such as a tilt adjust control 30. Tilt adjust control 30 may include any suitable mechanical or virtual user interface device configured to allow a user to communicate a desired tilt adjust amount to controller 16. For example, tilt adjust control 30 may include a dial, switch, pushbutton(s), lever, and/or keypad. Any of these user input devices may be implemented mechanically or virtually, such as in the case of a graphical user interface (GUI) on a screen or other display mounted on or otherwise associated with unicycle 10. In some examples, a user input device may include a voice user interface capable of speech recognition, through which a user may provide voice commands to the controller.

Regardless of the type of user input device, input 30 may be used to offset the zero pitch setpoint by an amount corresponding to the input. For example, a user may push a first button to communicate to the controller that the zero setpoint should be offset by one degree in a positive direction. In this example, the user may press a second button to communicate an offset of one degree in a negative direction. In other examples, a user may communicate the desired offset by turning a continuous or discrete dial, entering a number on a keypad, etc. In response, controller 16 may offset the zero setpoint by the desired amount, or by a corresponding amount.

For example, if a "three degrees forward" offset is indicated by the user, the zero setpoint may be adjusted to three degrees forward of vertical, and the controller would then use that new zero setpoint for comparing to actual pitch when controlling motors 14. In this example, the controller would attempt to maintain the unicycle at a three degree angle rather than the original zero degrees from vertical. Using the tilt adjust control in this manner, a user may adjust the desired tilt angle of the bike, in real time. This may be desired, for example, to compensate for a rider's body type, weight distribution on the bike, user comfort, and/or support surface inclines and declines.

The offset amount may be implemented in software or firmware by using a static variable, such that the desired offset amount remains at the value communicated by the user until the user provides a different input, such as via tilt adjust control 30. Furthermore, the value of this offset amount may be stored in nonvolatile memory such that the zero setpoint is offset by the same amount even if power to the controller is cycled. In some examples, a similar result may be achieved by using a hardware implementation, such as by providing a tilt adjust control 30 in the form of a dial that remains in a set position until the user sets a different position. In some examples, stored user profiles may be provided, and each user profile may have its own custom offset value. In these examples, a user may select one of the established profiles and the zero setpoint may be adjusted accordingly.

Controller 16 may receive braking input 24 from a second user input device such as a braking control 32. Braking control 32 may include any suitable mechanical or virtual user interface device configured to allow a user to communicate a desired braking amount to controller 16. For example, braking control 32 may include a hand-operated lever typical in bike and motorcycle braking systems, but may also or instead include one or more controls such as a dial, switch, pushbutton, and/or keypad. As with control 30, any of these user input devices (and any other user input devices or controls associated with unicycle 100) may be implemented mechanically or virtually, such as via a graphical user interface (GUI) on a screen or other display. Also as with control 30, control 32 may include a voice user interface capable of speech recognition, through which a user may provide voice commands to the controller.

Regardless of the form of control 32, braking input 24 may be communicated to controller 16, which may in turn use the input in a software- or firmware-controlled braking system. The braking system may be a regenerative braking system in which motors 14 are turned into electrical generators, dumping energy into the associated battery or batteries. The inventors have found that a regenerative braking system is generally sufficient for braking of a unicycle 10. Friction brakes may be included for additional braking capabilities, in some embodiments.

Controller 16 may control motors 14 in the software-controlled braking system in a fashion similar to the tilt adjust control system discussed above. In some examples, in response to braking input 24, the zero setpoint may be offset to artificially indicate to the controller that the unicycle is tipping over backward by some amount. To compensate, the controller will slow the motors, causing them to enter a regenerative-braking state if necessary to further slow the vehicle. This system may be in addition to the option a rider has to lean back to slow the vehicle.

FIGS. 2 and 3 depict an illustrative powered unicycle generally indicated at 100. Unicycle 100 may be an example of unicycle 10, and may include a wheel assembly 102 containing a drive system, a fork assembly 104 attached to the wheel assembly, and a frame portion 106.

Figure 4:
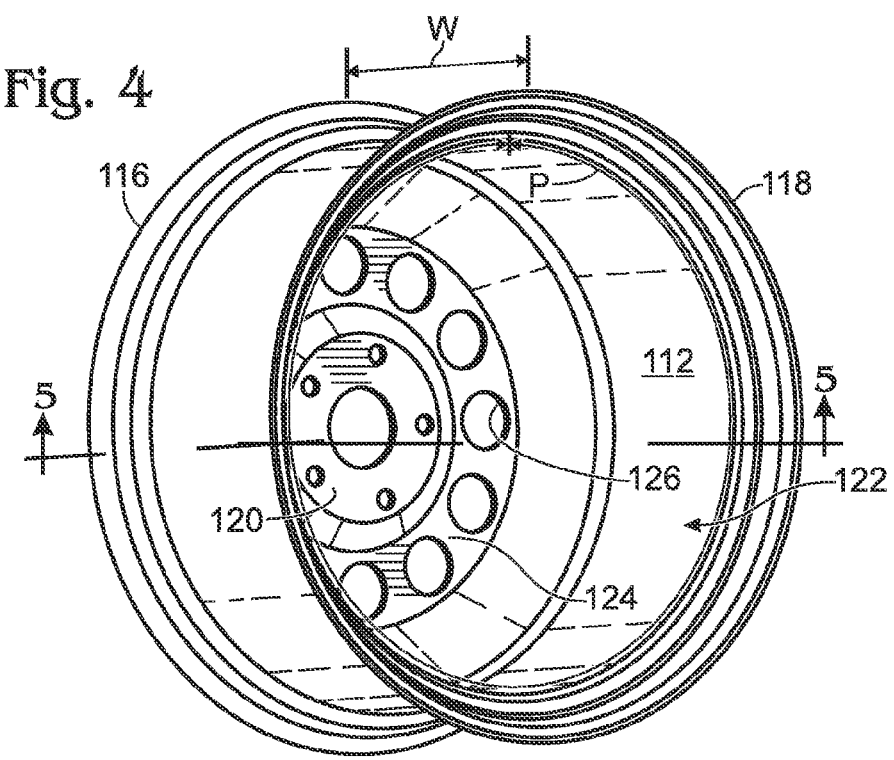
FIG. 4 is an isometric view of an embodiment of a wheel suitable for use on a powered unicycle.

Wheel assembly 102 may include a wheel 108 configured to rotate on an axis of rotation 110 and having a rim 112 on which may be mounted a tire 114. Wheel 108 may include any suitable wheel, and may be a typical motorcycle racing wheel. In some examples, wheel 108 may be hubless. In other examples, wheel 108 may have a hub and may be configured as shown in FIGS. 4 and 5, with rim 112 having an internal circumference or perimeter P and a width W defined between two opposing flanges 116 and 118. As shown in FIGS. 4 and 5, a mounting surface 120 of wheel 108 may be offset to one side to form an internal space 122 in wheel 108 defined by the rim and the mounting surface. Mounting surface 120 may be any suitable rigid surface for attaching wheel 108 to a drive system. For example, mounting surface 120 may include a metal plate having multiple through-holes arranged in a pattern to accommodate mounting bolts and lug nuts. Mounting surface 120 may be connected to rim 112 by a substantially solid plate 124 or by other suitable structures such as spokes. In some examples, plate 124 may include apertures 126 or slots for weight reduction, which may be arranged symmetrically around mounting surface 120 as shown in FIGS. 4 and 5.

Tire 114 may be attached to rim 112, such as at flanges 116 and 118, and may include any suitable tire configured to provide an interface between the rim and a support surface. In some examples, tire 114 may include a standard 200 mm motorcycle racing tire, which may be mounted to a 17-inch diameter×6-inch wide automotive example of a rim 112. In some examples, tire 114 may include a rounded or peaked profile to facilitate leaning and maneuverability while balancing the vehicle.

Returning to FIGS. 2 and 3, frame portion 106 may be mounted above wheel assembly 102. Frame portion 106 may include any suitable structure configured to provide a skeletal support for operatively connecting various components to the wheel assembly. For example, frame portion 106 may include a tubular framework configured to support a rider interface including a handlebar 128 and a seat assembly 130. Frame portion 106 may be constructed of any suitable materials, and may include aluminum tubing such as the tubing used in bicycle frame construction. This tubing may be formed into aesthetically pleasing appearance, which may be further enhanced by decorative body panels 132 attached to the frame. Body panels 132 may include any suitable lightweight plates or panels configured to attach to frame portion 106. Body panels 132 may, for example, provide decoration and/or color, cover gaps or frame tubes, and/or display information such as a company logo. In some examples, body panels 132 may include cowlings or fairings. In some examples, body panels 132 may include vacuum-formed rigid plastic plates. Frame portion 106 may include various attachment points, tabs, apertures, bosses, and the like for attaching these and other accessories such as saddle bags.

Handlebar 128 may include any suitable structure configured to provide support for the weight of a rider as well as a steering interface between the rider and the bike. In some examples, handlebar 128 may also provide a mounting surface for attaching accessories and/or controls. In the example depicted in FIGS. 2 and 3, a generally straight handlebar 128 having hand grips at opposite ends is attached at a forward end portion of frame portion 106. While a generally straight handlebar is depicted in this example, other standard and non-standard handlebar configurations may be suitable.

A brake lever 134, which is an example of brake control 32, and a two-button attitude adjust control 136, which is an example of control 30, may be mounted to handlebar 128 in locations easily accessible by the hands of the rider. A display module 138 may also be mounted to the handlebar, and may display information such as battery charge, power usage, tilt angle, and/or other information useful to a rider or operator. These controls and interfaces may be in electronic communication with the controller via cables (not shown) and/or by a Bluetooth and/or other wireless connection.

In some examples, frame portion 106 may include an extension member or crash bar 140 extending generally in the direction of travel of the vehicle. Crash bar 140 may include any suitable structure configured to contact a support surface 142 (such as the ground or a road) when unicycle 100 is pivoted forward about the Y axis, and to support the weight of the unicycle. In some examples, a structure such as a kickstand may be used to prevent the vehicle from tipping over in this pivoted mode. In some examples, crash bar 140 may itself be further configured to bias the vehicle against tipping over sideways when the vehicle is resting on the crash bar. In the example depicted in FIGS. 2 and 3, crash bar 140 is configured as a hoop structure having two members extending forward and a crossbar connecting the distal ends of the members. Resilient bumpers 144 may be affixed to contact points on crash bar 140.

Because crash bar 140 may support the weight of the vehicle and may further prevent tipping, unicycle 100 may be placeable into two modes. A first, or operational mode may include riding the vehicle in a generally vertical orientation with the single wheel contacting support surface 142. A second, or parked mode may include placing the vehicle in a tilted-forward position with the crash bar contacting support surface 142. The second mode may require the controller and/or motors to be at least partially disabled or inactivated such that the forward tipped posture of the vehicle is not automatically sensed and compensated for.

Seat assembly 130 may be operatively connected to and supported by frame portion 106. With continuing reference to FIGS. 2 and 3, as well as with more specific reference to FIG. 6, seat assembly 130 may include a seat portion 146 adjustably mounted to a support frame 148 by an adjustment assembly 150 including a spring in the form of a shock absorber 152. Seat portion 146 may include any suitable structure configured to support a human rider in a seated position, and may further be configured to allow a rider to straddle the seat in a crouched or standing position. For example, seat portion 146 may include a standard motorcycle or bicycle seat.

The seat may be adjustable in one or more directions, as shown in FIG. 6. In the example shown, the seat is supported by adjustment assembly 150 at a front end on a slotted hinge connection and at a rear end on a slotted bracket connected to shock absorber 152. The upper end of shock absorber 152 may be selectably positioned in the slot and clamped in place, such as by a quick-disconnect lever-operated clamp similar to those typically used to attach bicycle wheels to bicycle fork dropouts. Because the rear slotted bracket is angled, and the lower end of shock absorber 152 is pivotable at a fixed location on the frame, changing the position of the shock in the slot will change both the height and the angle of seat portion 146. In some examples, seat portion 146 may be adjustable from approximately 30 inches to approximately 38 inches above the ground. In other examples, seat assembly 130 may be mounted to frame portion 106 in a fixed position. In some examples, seat assembly 130 may include a circumferential frame and/or a fixed rear handle, such as a hoop handle 153 shown in the drawings.

Figure 8:
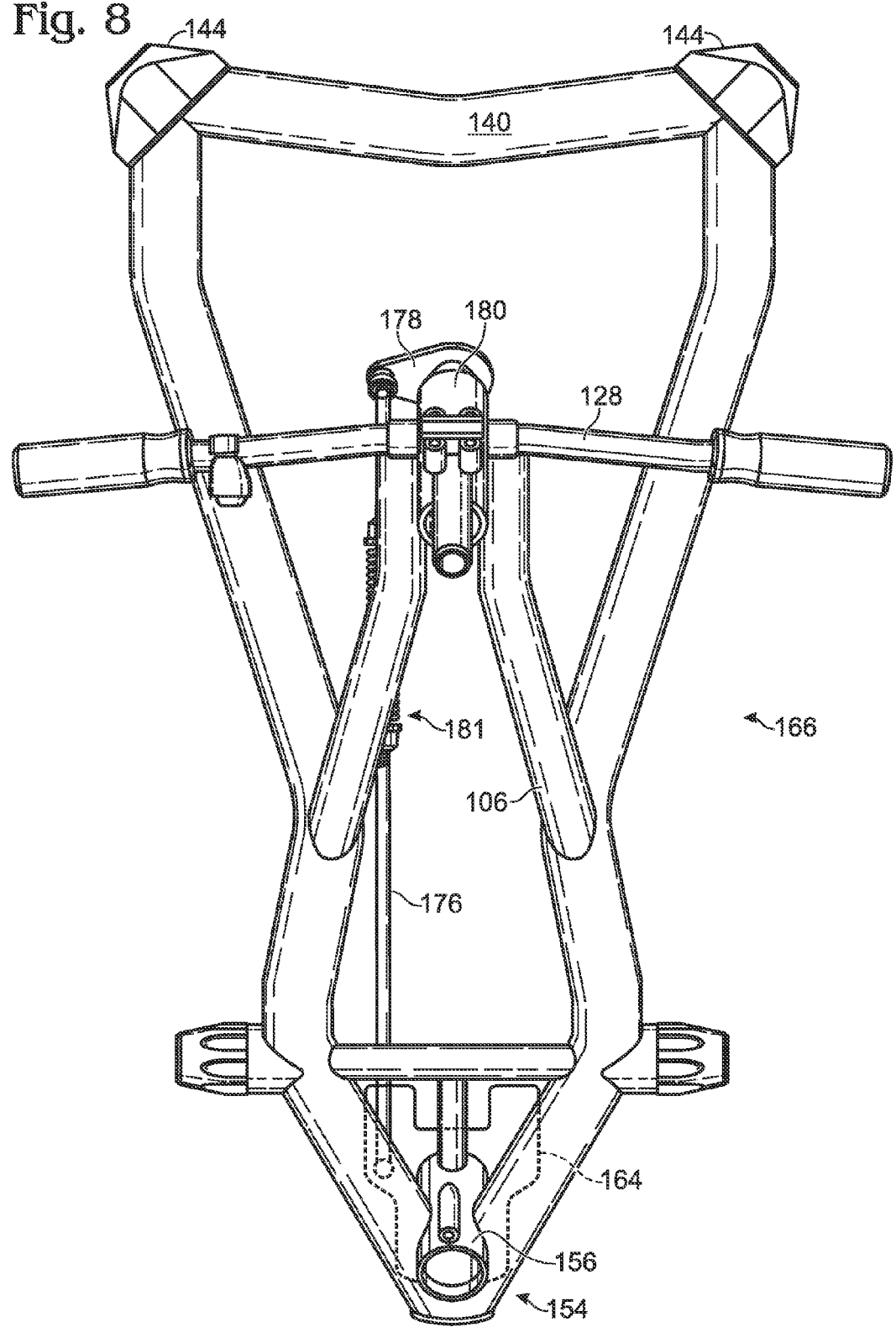
FIG. 8 is a top isometric view of the frame portion of FIG. 7, showing an implementation of the mechanism of FIG. 9.

Turning now to FIGS. 7 and 8, and with continued reference to FIGS. 2 and 3, frame portion 106 may include a pivotable connection 154 to fork assembly 104. Pivotable connection 154 may include any suitable structure configured to allow frame portion 106 to pivot generally side to side relative to fork assembly 104. For example, pivotable connection 154 may include a head tube 156 oriented at a head tube angle 158, further described below. Pivoting of the frame may be limited by a mechanical stop 160. Mechanical stop 160 may include any suitable structure configured to limit pivoting of the frame to a predetermined range. In the example shown in the drawings, mechanical stop 160 includes a member 162 having one end affixed to a rotating portion of head tube 156 and an opposite end protruding through an aperture in a fork crown bracket 164 fixed to fork assembly 104.

Figure 9:
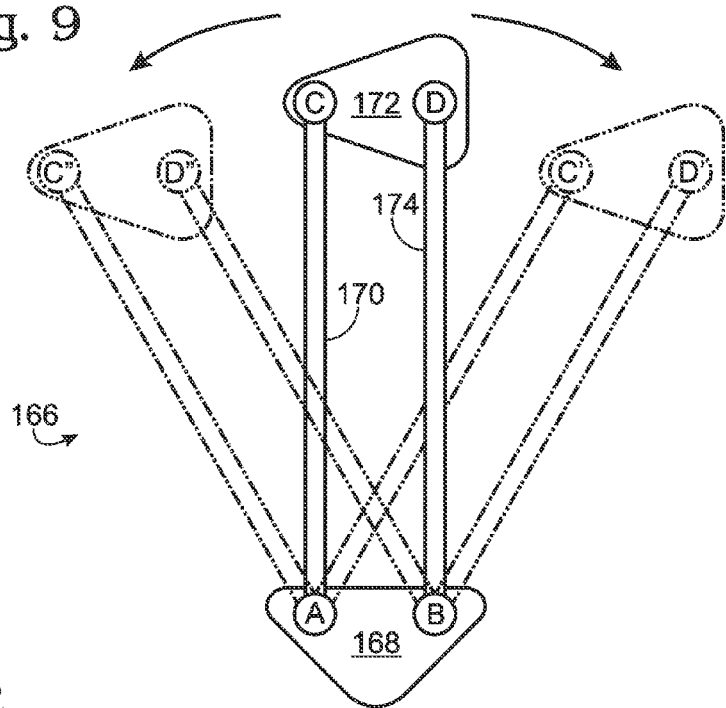
FIG. 9 is a schematic diagram of an illustrative four-bar linkage mechanism.

Pivoting of frame portion 106 relative to fork assembly 104 may be additionally or alternatively limited by a four-bar linkage mechanism. A schematic four-bar linkage mechanism 166 is depicted in FIG. 9. Mechanism 166 may include four links 168, 170, 172, and 174, attached to each other at four pivoting connections, A, B, C, and D. In this example, opposing pairs of links are substantially equivalent in length and parallel to each other. As shown in FIG. 9, if link 168 is held fixed, the other three links may be pivoted from side to side, and opposing links remain substantially parallel to each other at all times. Accordingly, mechanism 166 may be referred to as a parallelogram four-bar linkage mechanism. Importantly in this example, link 172 opposite to link 168 remains in the same orientation throughout pivoting of the linkage.

Returning to FIG. 8, the conceptual four-bar linkage mechanism 166 may be implemented in the depicted example of frame portion 106. In this example, frame portion 106 includes a drag link 176 attached at a front end to a bell crank bracket 178 and at a rear end to fork crown bracket 164. Drag link 176 is parallel to and offset to one side from the centerline of frame portion 106. Accordingly, in this embodiment, fork crown bracket 164 corresponds to link 168, drag link 176 corresponds to link 170, bell crank bracket 178 corresponds to link 172, and frame portion 106 corresponds to link 174.

Bell crank bracket 178 may include any suitable linking structure configured with two rotatable connections offset from each other. In the example shown, bell crank bracket 178 is a teardrop-shaped plate with the drag link attached to the smaller end of the teardrop and the handlebars attached at the larger end of the teardrop. Bell crank bracket 178 may be interchangeably termed the "front bell crank" and fork crown bracket 164 may be interchangeably termed the "rear bell crank" due to their similar functions in this context. The handlebar attachment is formed as a pivoting connection by including a rotatable head tube 180 configured such that handlebar 128 is independently pivotable relative to frame portion 106, but is pivotably coupled to bell crank bracket 178 such that they turn together.

As in mechanism 166, this forms a parallelogram four-bar linkage mechanism with a fixed link at bracket 164 and four rotatable connections. To facilitate return of the mechanism to a neutral, center position, a return spring or other biasing mechanism may be included. For example, a return spring 181 may function to return the frame portion to a center position. In some examples, return spring 181 may include two springs mounted inline or coaxially with respect to the drag link on either side of a spool-type bracket.

Swinging the free end of frame portion 106 side to side about head tube 156 at the pivoting end of frame portion 106 causes handlebar 128 to swing with the frame. However, the four-bar linkage causes handlebar 128 to remain generally parallel to the Y axis at all times. Among other things, this facilitates an intuitive steering experience for the rider.

As best seen in FIGS. 2 and 3, fork assembly 104 connects frame portion 106 to wheel assembly 102, and may include two main legs 182 configured to straddle the wheel assembly, with proximal ends 184 of the two legs meeting at or connected to fork crown bracket 164. Unlike with typical forks, distal ends 186 here may be attached to points on the wheel assembly spaced from axis of rotation 110. For example, wheel assembly 102 may include left and right hub cover plates 188 and 190, and distal ends 186 of legs 182 may each be attached to a respective hub cover plate at a point above the axis of rotation, as shown in the drawings.

Fork assembly 104 may further include additional bracing and/or framework such as rear trellis 185. Rear trellis 185 may include any suitable structure configured to reinforce the connection between legs 182 and fork crown bracket 164, and may further facilitate connection of fork assembly 104 to other components of unicycle 100. For example, rear trellis 185 may include tubular frame components, connection points, buttress plates, and/or braces. In some examples, rear trellis 185 may provide a support and connection framework for attaching a fender 187 as shown in FIGS. 2 and 3.

Hub cover plates 188 and 190 may each include any suitable rigid structure configured to substantially cover the lateral portions of wheel 108 within the diameter of the rim, and to provide supportive connection points for both fork 104 and a drive system disposed within space 122. One or both of the hub cover plates may include a bracket, brace, and/or other reinforced portions configured to facilitate a rigid support structure. Hub cover plates 188 and 190 may each include apertures or access ports, such as for accessing one or more batteries within space 122 without removing the hub cover plate. The unconventional attachment of fork assembly 104 may facilitate such accessibility through the side of the wheel, because the fork legs do not physically interfere with access.

The interaction of fork assembly 104 with other components of unicycle 100 is further discussed below regarding FIG. 13.

Steering of unicycle 100 may be affected by various aspects of the structures and mechanisms described above to create a more intuitive driving experience for the rider. In general, steering may be accomplished by leaning and redistributing weight on the vehicle in order to cause the wheel to go where the rider desires. The pivotable frame portion and four-bar linkage mechanism may facilitate steering by allowing the rider to further redistribute his or her weight by throwing the front end of the frame, and the seat on which the rider is seated, over to one side of the vehicle. Maintaining handlebar 128 square with respect to the wheel during this activity may further aid in steerability. Additionally, when the frame reaches the mechanical stop, added torque is placed on the fork assembly and therefore on the wheel assembly.

Further assisting in an intuitive steering experience is the geometry of the frame-to-fork connection. As described above, the pivot point connection at head tube 156 may be angled and located behind the midpoint of the vehicle. Head tube angle 158 may be in the range of about 15 degrees to about 35 degrees, and the inventors have found an angle of about 20 degrees to be suitable. Head tube 156 may be offset such that an imaginary line 192 drawn through the central long axis of the head tube intersects with support surface 142 behind the point where wheel 108 contacts support surface 142. A distance between the intersect point and the wheel contact point may be about four to about ten inches, and in some examples may be about five inches, although other offsets may be suitable.

Figure 10:
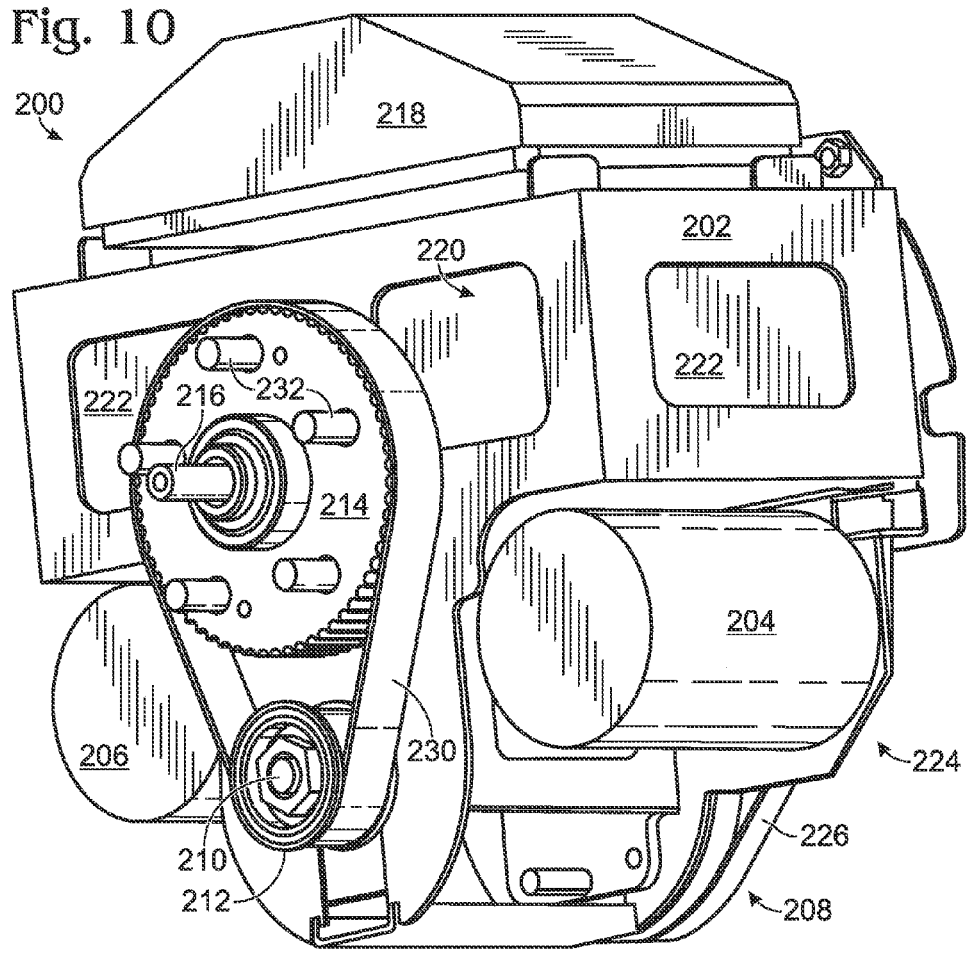
FIG. 10 is an isometric view of an embodiment of an electric-powered drive system.
Figure 11:
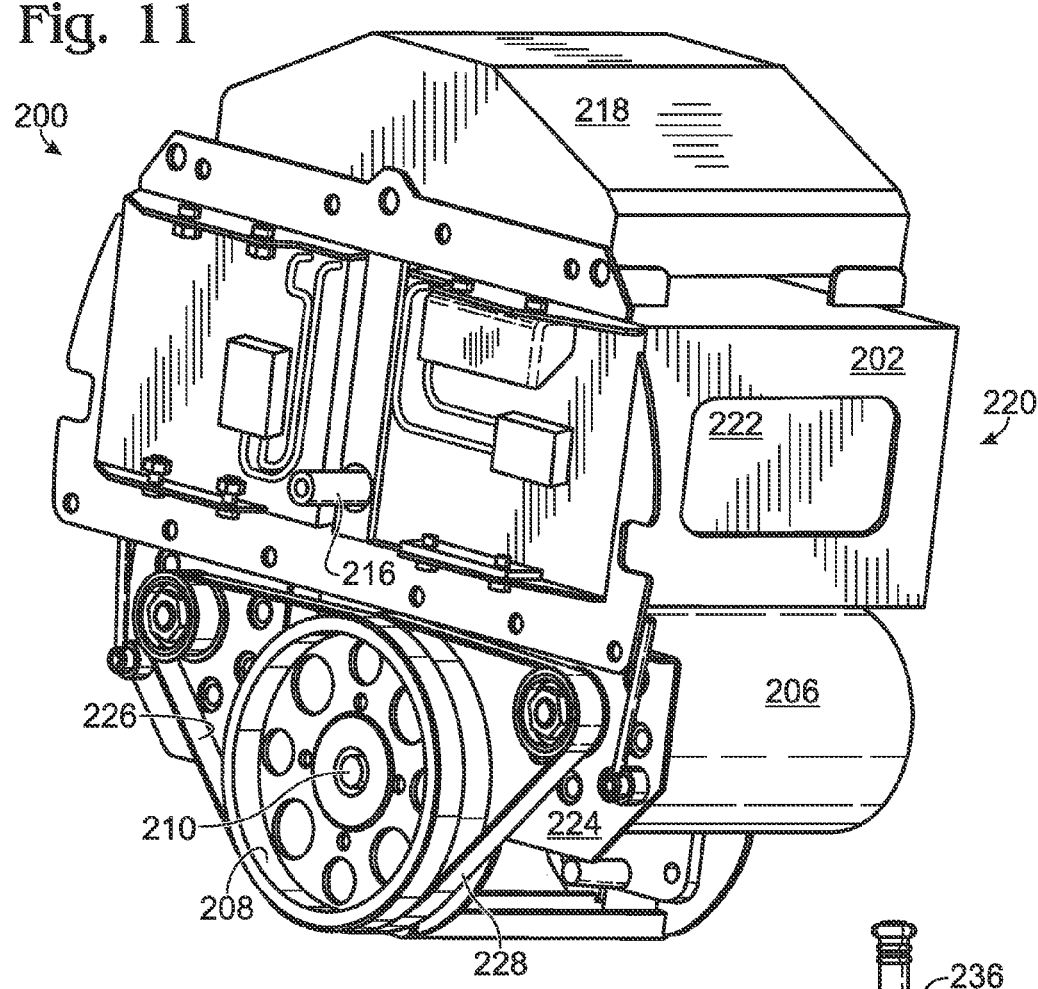
FIG. 11 is an isometric view of the drive system of FIG. 10, viewed from an opposite side.

Turning now to FIGS. 10 and 11, an illustrative drive system 200 suitable for use with unicycle 100 is depicted in two different isometric views. Also, in FIG. 12, system 200 is depicted with only certain drive components shown in an isometric view to illustrate the relationships between those components. Drive system 200 may include any suitable devices and components configured to fit substantially within internal space 122 of wheel 108 or a similar wheel and to provide sustained rotational force to rotate the wheel in either direction, thereby causing the vehicle to travel across support surface 142. In this example, drive system 200 includes a housing 202, two electric motors 204 and 206, a main drive pulley 208, a countershaft 210, a countershaft pulley 212, a main lug pulley 214, and an axle 216.

Housing 202 may include any suitable structure configured to house a controller and a battery or batteries, and to provide structural support and connection points for mounting the various drive components. In this example, housing 202 is a rigid metal housing having an upper compartment 218 for containing an electronic controller (not visible) substantially similar to controller 16, a battery compartment 220 for housing one or more batteries 222, and a lower drive mounting portion 224 for mounting the various moving parts of the drive system. Axle 216 passes through the central portion of the housing, and in this example is a non-rotating shaft on which other components may be supported and/or mounted.

Electric motors 204 and 206 may be mounted to housing 202 on opposite sides, and transverse to the direction of travel of the unicycle. The motors may include any electric motors suitable for driving wheel 108 with sufficient power to facilitate transportation of an adult human across support surface 142 at a reasonable speed. In some examples, a single motor may be used. In some examples, non-electric motors may be included, such as two- or four-stroke internal combustion engines. In the example depicted in the drawings, each motor is a 1,000 Watt electric motor.

Motors 204 and 206 may be powered by storage battery or batteries 222. Batteries 222 may include any portable power storage device capable of providing adequate power to motors 204 and 206 for a desired usage period. In some examples, batteries 222 may include Lithium-Ion batteries and/or lead acid batteries. Batteries 222 may be rated at 30 amp-hours of battery life with 150 amps of peak current flow to the motors. As discussed above, batteries 222 may be housed in battery compartment 220 of the housing, and may be accessible through an access port or window on a side of wheel assembly 102 without disassembling the vehicle.

Figure 12:
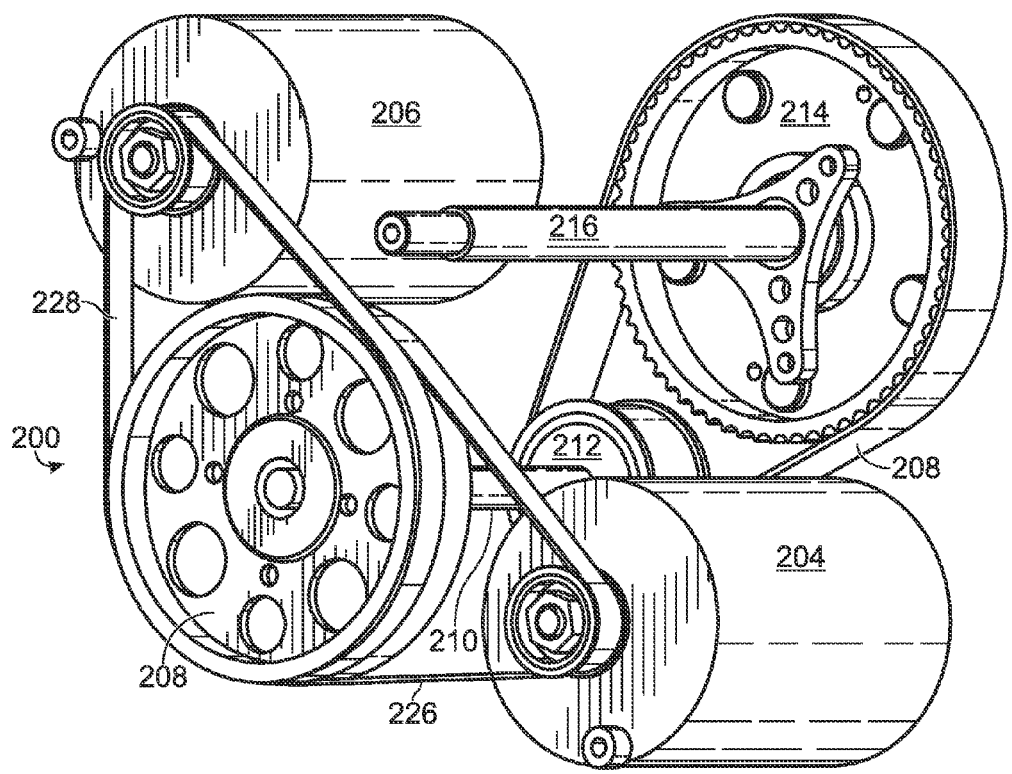
FIG. 12 is an isometric view of selected drive components of the drive system of FIG. 10.

Motors 204 and 206 may be operatively connected to a common drive pulley in the form of main drive pulley 208 by respective timing belts 226 and 228 as shown in FIGS. 11 and 12. The resulting torque created by main drive pulley 208 is transmitted to countershaft pulley 212 on the opposite side of housing 202 by countershaft 210. The term "jackshaft" may be used interchangeably with the term "countershaft." A main drive belt 230 then transfers the torque from the jackshaft pulley to main lug pulley 214, which rotates around stationary axle 216. In some examples, chains or other transmission devices may be used in place of one or more of the belts just described. In some examples, one or more additional typical supporting components may be included, such as idler pulleys, belt tensioners, torque rods, etc., all carrying out their standard and known functions.

Main lug pulley 214 may include a plurality of lugs 232 for mounting wheel 108, such as by attaching mounting surface 120 of the wheel to the threaded lugs using lug nuts (not shown). This mounting method may be substantially similar to the standard method of attaching an automotive wheel to a car when changing a flat tire. Accordingly, the wheel may be affixed to the main lug pulley, and the torque of main lug pulley 214 may be transferred to wheel 108. Motors 204 and 206 thereby indirectly cause the wheel to rotate. The controller and associated systems can therefore control the speed and direction of wheel 108 by controlling the speed and direction of the motors. One or more speed sensors may be included in drive system 200 for providing the controller with feedback regarding actual speed of the motors and/or wheel.

Figure 13:
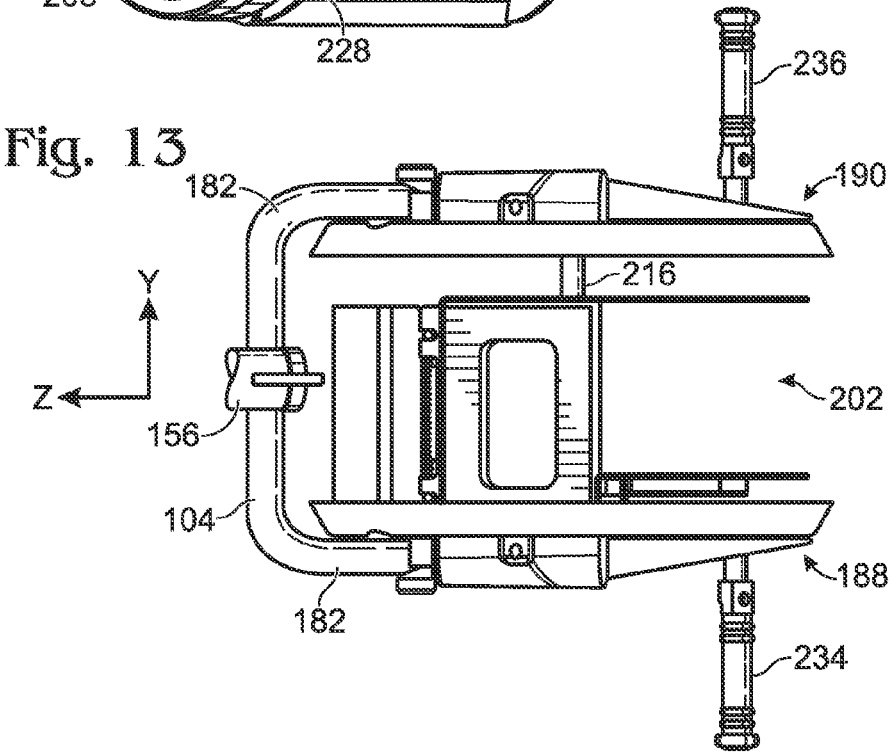
FIG. 13 is a rear plan view of a portion of the powered unicycle of FIG. 2, showing connections between a fork, drive housing, hub plates, and foot pegs.

Turning now to FIG. 13, a rear plan view of a portion of unicycle 100 is depicted, showing the connections between fork assembly 104, hub cover plates 188 and 190, housing 202, and axle 216. In general, these structures are affixed to each other as shown and as explained below, and wheel 108 is mounted only to the lug pulley as described above, allowing the wheel to spin freely around the housing and within the fork and hub cover plates, none of which is attached directly to the wheel. As depicted in FIG. 13, legs 182 of fork assembly 104 straddle the hub cover plates, mounting directly to the plates above the axle. Housing 202 is bolted directly to left hub cover plate 188, and may further be attached to axle 216. Right cover plate 190 is attached to axle 216. Accordingly, the combination of the fork, hub plate, housing, and axle may form a rigid unitary structure capable of supporting the wheel and transferring torque and other moments from the rider and steering system to the wheel.

Foot pegs 234 and 236 may be attached to respective hub plates, or directly to opposite ends of axle 216. Foot pegs 234 and 236 may include any suitable structure configured to support a rider's foot, in a resting and/or standing posture, and to transfer torque from the feet of the rider to the wheel assembly. In some examples foot pegs 234 and 236 may be hinged to allow them to be folded out of the way as desired. In some examples, crash bars 238 may be provided near foot pegs 234 and 236, respectively, as shown in FIGS. 2 and 3.

These crash bars may extend laterally beyond the hinged connection of foot pegs 234 and 236, and may provide protection from the foot pegs, such as to a rider's leg when passing by or to an underlying surface when storing or otherwise laying the vehicle on its side.

In addition to the other aspects of vehicle steering described above, foot pegs 234 and 236 may also enhance or facilitate steering of unicycle 100. The foot pegs may be used by a rider as a steering control input. Because the steering pivot at head tube 156 is behind the axis of rotation of the wheel, the rider may be able impart a twist directly on the wheel as if standing on a plank balanced on a fulcrum. This twist may cause the wheel to lean over and follow a turning arc. This rider/foot peg interaction, in conjunction with leaning of the rider's body and moving of the handlebars side to side, may allow the rider many degrees of freedom in steering. This, in turn, may facilitate tasks such as traversing uneven terrain.

Figure 14:
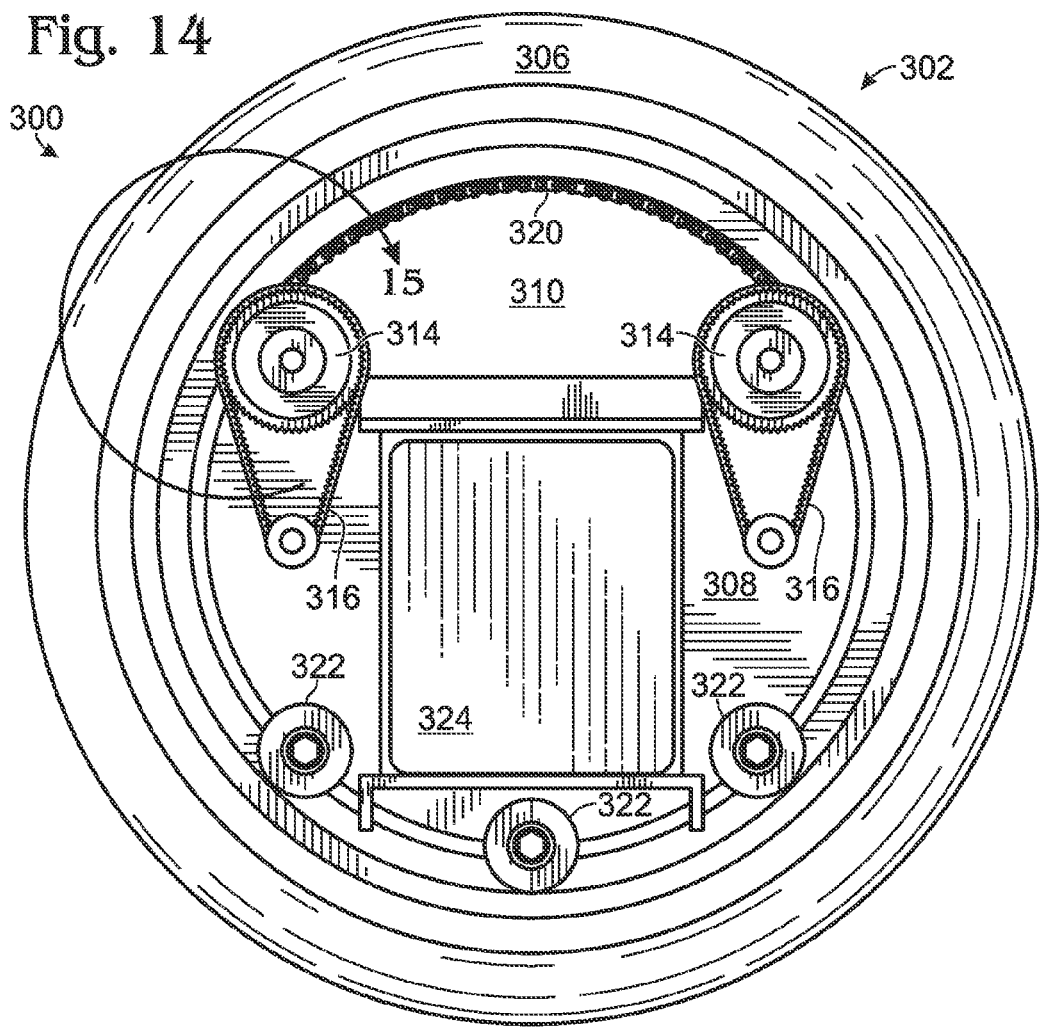
FIG. 14 is a side elevation view of another embodiment of a drive system installed in a hubless wheel.
Figure 15:
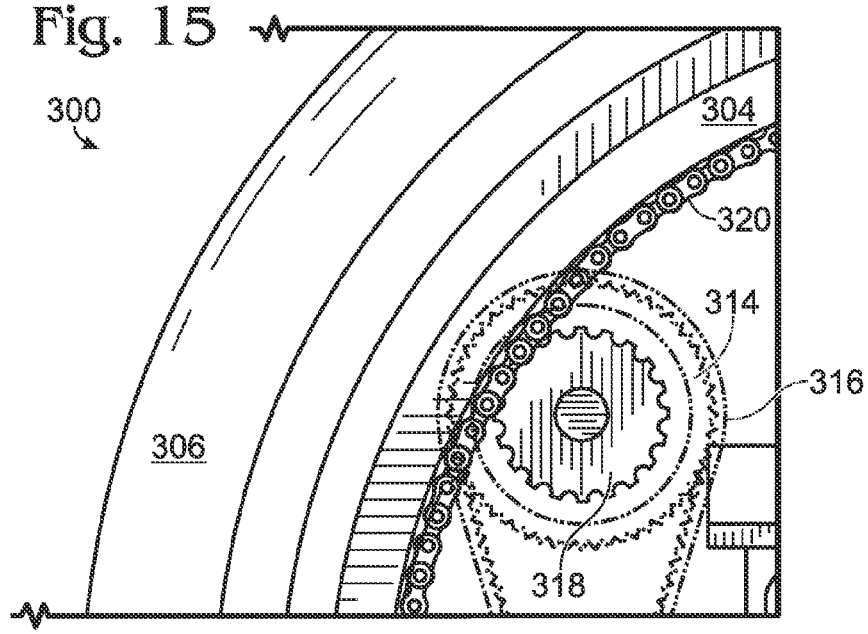
FIG. 15 is a side view of a portion of the drive system of FIG. 14, showing the interaction between a drive sprocket and a ring gear.
Figure 16:
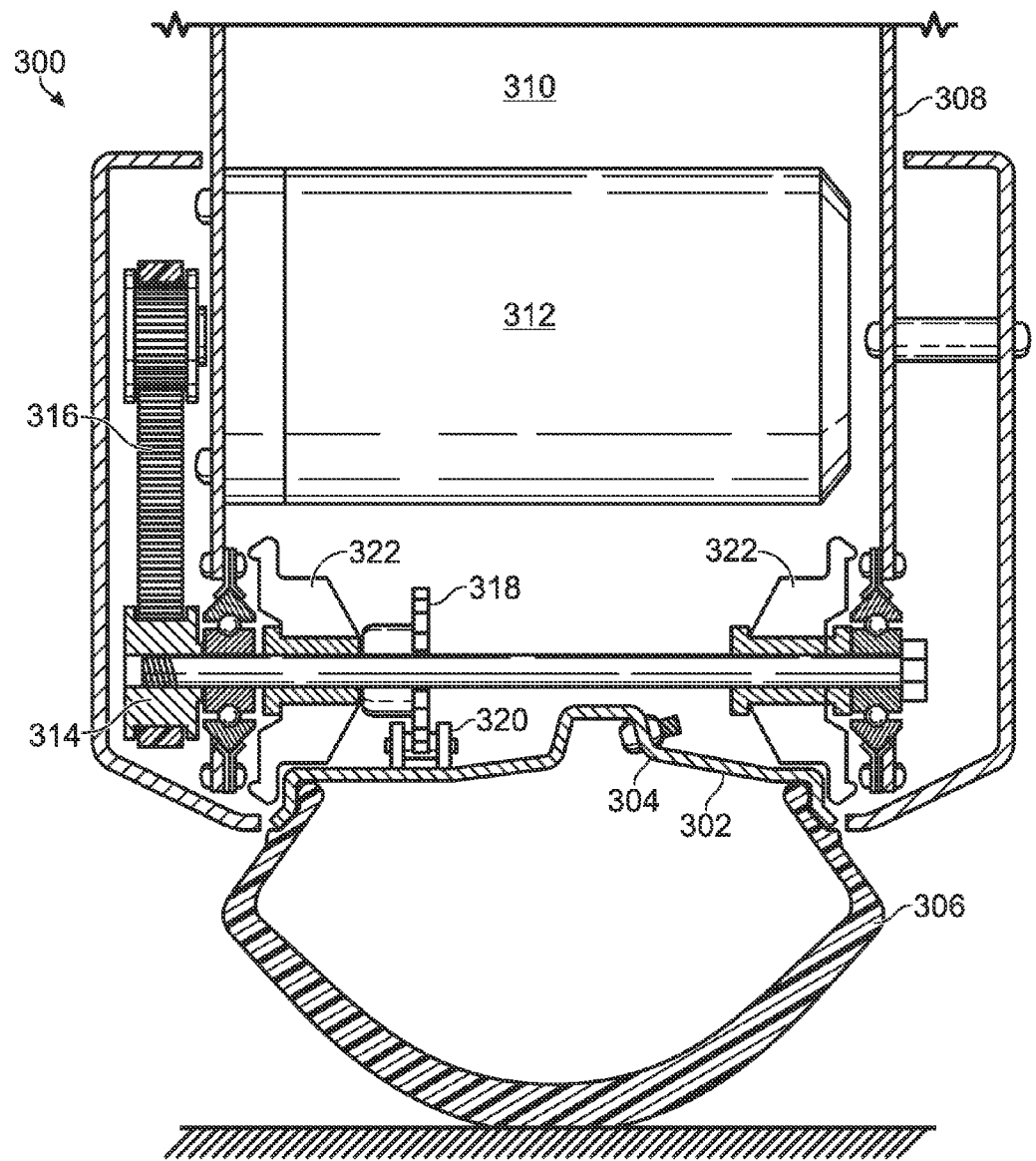
FIG. 16 is an end sectional view of another embodiment of a hubless drive system.

Other examples of a drive system suitable for use in a unicycle constructed according to the present disclosure is depicted in FIGS. 14-16 and generally indicated at 300. Drive system 300 is a hubless drive system, also referred to as a rim drive system. In this example, the wheel of the unicycle is a hubless wheel 302, which may include a rim 304 and an attached tire 306, but which does not include structures such as mounting surface 120 or spokes 124. Drive system 300 may include a housing 308 disposed within internal space 310 of rim 304, one or more battery-powered motors 312 operatively connected to one or more respective drive pulleys 314 by belts 316, one or more drive sprockets 318 associated with each drive pulley 314, and a ring gear 320 disposed on an inner surface of rim 304. Idler rollers 322 may be attached to housing 308 at various points around the circumference of the rim to maintain the housing positioned properly within the rim. In other examples, the idler rollers may themselves be driven by one or more motors, providing a frictional drive by interacting directly with rim 304. In some examples, drive system 300 and/or housing 308 may not take up the entirety of space 310, leaving an opening or void or through-space in the wheel and revealing the hubless nature of the assembly. An example of this type of void space is shown above the housing in FIG. 14.

Drive system 300 may operate to rotate wheel 302 by controlling motors 312 to rotate drive sprockets 318 via coaxial pulleys 314. Rotation of the rim and wheel may then result from interaction between the rotating drive sprockets and the complementary ring gear, which is fixed with respect to the rim. In some examples, the drive sprockets and the ring gear have complementary teeth. In some examples, the drive sprockets are toothed, and the ring gear is a drive chain affixed to the rim and having spaces corresponding to the teeth of the sprockets.

A fork assembly may attach to housing 308 either directly or via hub plates, similar to the connections described above regarding unicycle 100. Because the wheel is hubless and the drive and housing may fit into a lower portion of the wheel, an open space may be included to reveal the hubless nature of the wheel. In some examples, this space may be used to house one or more batteries. In some examples, the battery or batteries may be housed in a space between opposing drive motors, such as in space 324 shown in FIG. 14.

Figure 17:
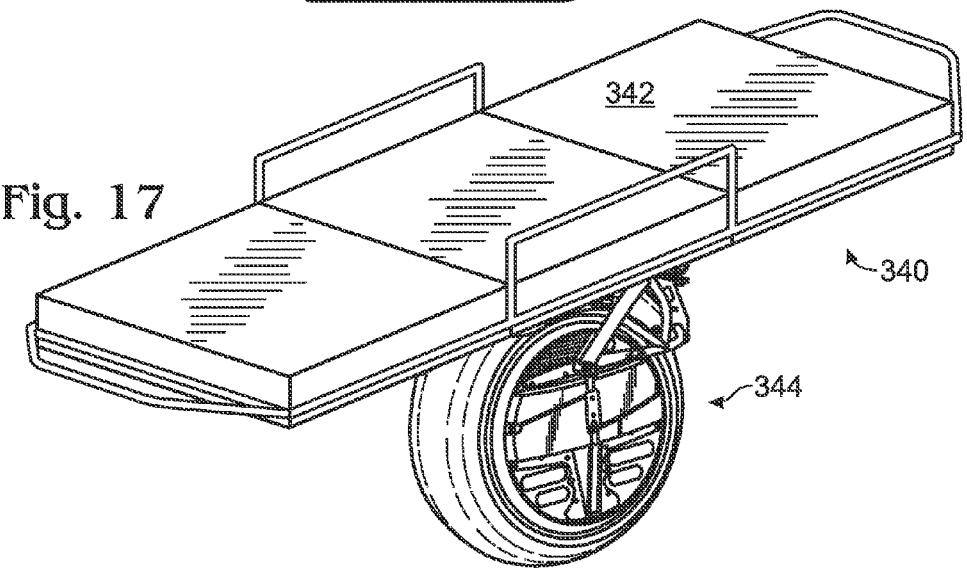
FIG. 17 is an isometric view of an embodiment of a powered unicycle having a gurney affixed thereto.

FIG. 17 is an isometric view of an illustrative embodiment in which a mounted accessory 340 is operatively connected to the wheel assembly rather than a seat for a mounted rider as described in the examples above. Mounted accessory 340 may be any suitable structure configured to carry, transport, or otherwise move a load across a support surface on a unicycle according to the present disclosure. In the example depicted in FIG. 17, mounted accessory 340 includes a gurney 342. In this example, gurney 342 may be operatively connected to a wheel assembly 344 substantially similar to wheel assembly 102, driven by a drive system similar to drive systems 200 or 300. Because wheel assembly 102 is steerable by leaning, and balancing is automatically controlled with respect to pitch, a vehicle such as the combination of gurney 342 and wheel assembly 344 may facilitate moving a patient by an operator holding one end of the gurney. Transport of the vehicle may be accomplished similar to operating a wheelbarrow, but may be significantly easier than carrying the gurney or manually pushing or pulling the gurney, especially over rugged terrain or over long distances.

The vehicle in this example may be capable of carrying a patient weighing up to 350 lbs. The vehicle may be capable of moving at a speed of up to six miles per hour, and may be capable of moving with a passenger on the gurney up an incline of up to about a 30% grade. In some examples, the vehicle with gurney 342 may include a removable battery that can be removed without tools and the battery may have a recharge time of six hours.

In some examples, a steering area may be situated at one end of gurney 342, and may include a throttle control, an on/off button, a tilt adjust control, a brake control, and other features desired such as a screen to display desired information (e.g., hill grade, speed, battery life, current weight, etc.). The vehicle may be adapted such that the driver walking behind the vehicle at the steering area can maintain a center of gravity of the gurney above the wheel. The steering configuration may allow the driver to rotate the substantially horizontally situated gurney in clockwise or counterclockwise directions in order to effectuate steering while moving. When the vehicle is not in use, one end of the gurney may rest against the ground in a parked configuration. In some examples, gurney 342 may be equipped with a quick release mechanism (not shown), allowing quick removal of the gurney from the wheel assembly.

EXAMPLES AND ADDITIONAL DETAILS

Any user interface or control associated with a vehicle such as unicycle 10 or unicycle 100 may include any suitable physical or virtual user interface configured to allow an operator to communicate information to the controller, or to carry out one or more functions of the controller itself. For example, a user interface may include one or more manipulable controls such as a lever, dial, switch, slider, pushbutton, keypad, and/or knob, any of which may be implemented mechanically or virtually, such as via a graphical user interface (GUI) on a screen or other display. Any manipulable control may be manipulated by a body part of the operator, such as by a hand, a foot, and/or one or more fingers or toes. In some examples, a user interface may include a voice interface capable of speech recognition, through which the operator may provide voice commands to the controller. In some examples, a user interface may include a wearable computing device, such as an article of clothing or a wrist- or head-mounted interface. In some examples, a user interface may include any suitable device implanted on or in the operator's body.

Unicycles such as unicycle 10 and unicycle 100 may be electric-powered and therefore lack traditional noises associated with gas-powered engines. In some embodiments, unicycle 10 may include sound features such that unicycle 10 may project a gas-powered engine noise. Other sound features may include a start-up sound, a revving sound, a power-down sound, and/or any other sound desired. The sound features may be electronically controlled, such as by modulating control signals to one or more motors. In some examples, this may include pulse width modulation. The sound features may be electronically triggered to output based on an associated action of unicycle 10 (e.g., turning a key to start up unicycle 10 may cause a start up sound; movement of unicycle 10 may cause a revving or movement sound, etc.). Output of the sound feature may be generated by the motor itself, or may occur through one or more speakers coupled to unicycle 10, the one or more speakers being in communication with the controller of unicycle 10.

Various accessories and auxiliary components may be included in a unicycle according to the present disclosure. For example, a unicycle may include one or more headlights, taillights, reflective surfaces, hand grips, turn signals, warning lights, and/or audible warning devices such as a vehicle horn or bell.

In some examples, a unicycle may include a charging interface to allow the vehicle to connect to a charging device. The charging interface may include a connector or a non-contact magnetic coil for inductive power transfer.

Some embodiments of the present disclosure may be described as a one-wheeled vehicle including a centerless wheel.

Some embodiments of the present disclosure may be described as a powered vehicle having two motors to allow redundancy, different speed settings, and/or variable torque without altering drive gear ratios.

Some embodiments of the present disclosure may be described as including a rechargeable lithium-ion battery with an about 20 amp-hour or an about 30 amp-hour capacity mounted within a battery bay in the wheel. In some embodiments, a prismatic battery form-factor may be used similar to batteries utilized in some automotive electric vehicles. In other embodiments, a sealed about 20 amp-hour lead-acid battery may be utilized.

Some embodiments of the present disclosure may be described as a one-wheeled vehicle having one or more electronic controllers housed within the wheel above a battery bay. This arrangement may facilitate heat management by placing the electronic components in close proximity to the battery, thus shortening the length of required wiring and reducing associated thermal losses, cable connectors, and cable failure. In some embodiments, a gyro controller board may be placed within approximately three inches of two motor controllers for controlling the electric drive motors, and the motor controllers may be placed within about eight inches of the battery and drive motors.

Some embodiments of the present disclosure may be described as a one-wheeled vehicle having software controls. The vehicle may include computer hardware and software and the ability to connect to and interact over a wireless or other network (e.g., wifi, cellular, 3G, 4G, LTE, cable connector, etc.). The vehicle may include one or more computing systems that may include standard features such as a screen, a memory, a processor, a wireless antenna, etc. The vehicle may also be configured to interact or interface with a computer, such as a laptop, a tablet, a PDA, and/or a smartphone.

Some embodiments of the present disclosure may be described as a one-wheeled vehicle having software controls configured to control various functions such as remote starting of the vehicle, lights, radio, security, and/or safety and riding features. The software may be paired to a smartphone or other computing device over a network so that the smartphone or other device can interact with the vehicle to access, monitor, and/or control such functions.

Some embodiments of the present disclosure may be described as a one-wheeled vehicle having hardware and software controls configured to create a wireless hotspot. The vehicle may be paired to a smartphone or other electronic device such that when the smartphone is within range of the hotspot, the vehicle may unlock certain security features. The vehicle may automatically unlock the security features when the smartphone is in range or upon receiving an indication from the smartphone to unlock the features (e.g., the user enters a code indicating to unlock the cycle). In some embodiments, the vehicle may be on any network and may be paired to a smartphone or other computing device over such a network to control, access, or monitor the security features. The vehicle controller system may have an onboard website that may be presented to an external wireless-enabled device through the onboard wireless (e.g., wi-fi) hot spot. Only a standard web browser may be required.

Some embodiments of the present disclosure may be described as a one-wheeled vehicle having a speed of approximately 12.5 mph; a range of approximately 20 miles; two 1,000 W motors for a total of approximately 2,000 Watts of power; approximately 30 amp-hours of battery life; and approximately 150 amps of peak current flow to the motors.

Some embodiments of the present disclosure may be described as a one-wheeled vehicle having an attitude adjustment, or tilt, feature. Attitude adjustment may allow the rider to make minor adjustments in the balance point of a self-balancing vehicle. This allows the rider to find his or her particular balance point, so that he or she can easily control the acceleration and deceleration of the vehicle by leaning forward or backward, respectively. A balance point may be affected by the rider's personal body geometry and weight distribution. Additionally, a balance point may be affected by the terrain, such as when riding up or down a hill. In these examples, a tilt adjustment may be beneficial to maintain rider comfort and balance.

Some embodiments of the present disclosure may be described as a one-wheeled vehicle having an attitude adjustment control with an up and a down button. Pressing the up attitude adjustment button may add a small negative offset to the balance point of the vehicle, causing the nose of the vehicle to pitch up. Pressing the down attitude adjustment button may add a small positive offset to the balance point of the vehicle, causing the nose of the vehicle to pitch down.

Some embodiments of the present disclosure may be described as a one-wheeled vehicle having an attitude adjustment system wherein an offset value is stored in nonvolatile memory, so that the offset persists between power cycles, allowing a rider to have the vehicle balanced for riding once the power is turned on and balance is engaged.

Based on the above description and the associated drawings, the following examples in the form of numbered paragraphs describe various embodiments of apparatuses and methods of the disclosure.

A0. A one-wheeled vehicle comprising:
  a single wheel assembly including a single wheel having an axis of rotation and a rim having an inner circumference, and a tire attached to the rim;
  an electric drive system coupled to the wheel assembly and substantially contained within the inner circumference of the rim;
  a frame including a body having an extension member generally extending perpendicular to the axis of rotation of the wheel, and a fork operatively connected to the body, the fork having two legs straddling the wheel assembly;

wherein a distal end of each of the legs of the fork is attached to the wheel assembly only at a respective connection spaced from the axis of rotation of the wheel.

A1. The vehicle of paragraph A0, wherein the vehicle is configured to travel in an operational mode in which the vehicle travels with only the single wheel assembly contacting a support surface.

A2. The vehicle of paragraph A1, wherein the vehicle is further configured to convert between the operational mode and a parked mode in which the frame is rotated about the axis of the wheel such that the extension member contacts the support surface and resists lateral toppling of the vehicle.

A3. The vehicle of paragraph A0, wherein the wheel rotates about an axle, and each of the distal ends of the fork are attached to the wheel assembly above the axle relative to the support surface when the vehicle is in the operational mode.

A4. The vehicle of paragraph A3, the electric drive system further comprising a battery, wherein the battery is accessible through the side of the wheel assembly without interference from the fork.

A5. The vehicle of paragraph A3, the wheel assembly further including a first hub cover disposed over a first lateral side of the wheel and a second hub cover disposed over a second lateral side of the wheel opposite the first side, the first hub cover being affixed to the axle and the second hub cover being affixed to the drive system.

A6. The vehicle of paragraph A5, wherein the distal ends of the fork legs are respectively attached to the first and second hub covers.

A7. The vehicle of paragraph A0, wherein the extension member comprises a hoop structure.

A8. The vehicle of paragraph A7, wherein the hoop structure comprises two legs extending generally perpendicular to the axis of rotation and a crossbar oriented parallel to the axis of rotation rigidly linking distal ends of the two legs.

B0. A one-wheeled vehicle comprising:
a wheel assembly including a single wheel having an axis of rotation and a rim having an inner circumference;
an electric drive system coupled to the wheel assembly and substantially contained within the inner circumference of the rim;
a frame generally oriented perpendicular to the axis of rotation of the wheel, the frame having a free end portion and a pivoting end portion;
a handlebar operatively connected to the free end portion of the frame; and
a support assembly having a first end pivotably connected to the pivoting end portion of the frame and a second end affixed to the wheel assembly;
wherein the frame is configured to pivot side to side relative to the wheel assembly, as limited by a mechanical stop.

B1. The vehicle of paragraph B0, wherein the pivotable connection between the connector assembly and the frame comprises a head tube disposed behind a vertical line running through the axis of rotation.

B2. The vehicle of paragraph B1, wherein the head tube angle is about 15 to about 35 degrees relative to vertical.

B3. The vehicle of paragraph B2, wherein the head tube angle is about 20 degrees.

B4. The vehicle of paragraph B1, wherein the vertical line intersects a support surface at a first point, a line through a long axis of the head tube intersects the support surface at a second point, and the head tube is offset from the vertical line such that the second point is behind the first point relative to a forward direction of vehicle travel.

B5. The vehicle of paragraph B0, further comprising a seat assembly for carrying the weight of a rider, the seat assembly being operatively connected to the frame between the free end and the pivoting end.

B6. The vehicle of paragraph B5, the seat assembly further comprising an adjustable spring configured to absorb shocks and to adjust a height of the seat assembly relative to the frame.

B7. The vehicle of paragraph B0, further comprising a first bell crank operatively connected to the free end portion of the frame, a second bell crank operatively connected to the pivoting end portion of the frame, and a drag link connecting the first bell crank to the second bell crank, wherein the first bell crank, second bell crank, frame, and drag link together form a parallelogram four-bar linkage mechanism.

B8. The vehicle of paragraph B7, wherein the second bell crank is fixed, and the handlebar is operatively connected to the first bell crank, such that the four-bar linkage mechanism is configured to maintain a substantially constant orientation of the handlebar relative to the wheel assembly as the frame is pivoted side to side.

B9. The vehicle of paragraph B7, the four bar linkage mechanism further comprising a biasing member configured to bias the frame toward a neutral side-to-side orientation.

B10. The vehicle of paragraph B9, wherein the biasing member comprises a spring, the spring being mounted coaxial to the drag link.

C0. A one-wheeled vehicle comprising:
a wheel assembly including a single wheel having an axis of rotation and a rim having an inner circumference;
a drive system coupled to the wheel assembly and including an electric motor;
a controller for controlling a variable speed and direction of the electric motor, the controller in electronic communication with an attitude sensing system;
wherein the drive system, controller, and attitude sensing system are all substantially contained within the inner circumference of the rim; and
further wherein the controller is configured to automatically adjust the speed and direction of the motor, without a manual throttle control, to reduce a difference between a pitch measured by the attitude sensing system and a zero pitch setpoint.

C1. The vehicle of paragraph C0, further including a first user input device in electronic communication with the controller, the first user input device being operable by a user to provide a selectable attitude offset amount to the controller, wherein the controller is configured to adjust the zero pitch setpoint by the offset amount before comparing the adjusted setpoint to the measured pitch.

C2. The vehicle of paragraph C1, wherein the first user input device comprises a two-pushbutton switch mounted to the handlebar, wherein a first of the two pushbuttons provides a positive amount of attitude offset and a second of the two pushbuttons provides a negative amount of attitude offset.

C3. The vehicle of paragraph C1, wherein the selected attitude adjustment amount is retained in a nonvolatile memory for maintaining the adjusted zero pitch setpoint after cycling power to the controller.

C4. The vehicle of paragraph C0, wherein the attitude sensing system comprises a pitch sensor configured to determine an up and down rotation of the vehicle about an axis parallel to the axis of rotation of the wheel, and a roll sensor configured to determine a side to side rotation of the vehicle about an axis parallel to a direction of vehicle travel.

C5. The vehicle of paragraph C4, wherein the measured pitch corresponds to a pitch input received from the pitch sensor.

C6. The vehicle of paragraph C5, wherein the controller is configured to compensate for a pitch error in the received pitch input based on a roll input received from the roll sensor.

C7. The vehicle of paragraph C4, wherein the controller is configured to shut off power to the vehicle in response to a received roll input indicating that the vehicle has fallen over.

C8. The vehicle of paragraph C0, further including a second user input device in electronic communication with the controller, the second user input device being operable by a user to provide a selectably variable braking input to the controller.

C9. The vehicle of paragraph C8, wherein the controller is configured to slow the vehicle in response to receiving a braking input from the second user input device, using only a regenerative braking system.

C10. The vehicle of paragraph C8, wherein the second user input device comprises a hand-operated brake lever mounted to the handlebar.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A one-wheeled vehicle comprising: a wheel assembly including a single wheel having an axis of rotation and a rim having an inner circumference; a drive system coupled to the wheel assembly and including an electric motor; a controller for controlling a variable speed and direction of the electric motor, the controller in electronic communication with an attitude sensing system; a frame generally oriented perpendicular to the axis of rotation of the wheel, the frame having a free end portion and a pivoting end portion, an extension member generally extending perpendicular to the axis of rotation of the wheel, and a fork operatively connected to the pivoting end portion of the frame, the fork having two legs straddling the wheel assembly; a handlebar operatively connected to the free end portion of the frame; and a support assembly having a first end pivotably connected to the pivoting end portion of the frame and a second end affixed to the wheel assembly; wherein the frame is configured to pivot side to side relative to the wheel assembly, as limited by a mechanical stop; wherein a distal end of each of the legs of the fork is attached to the wheel assembly only at a respective connection spaced from the axis of rotation of the wheel; wherein the drive system, controller, and attitude sensing system are all contained within the inner circumference of the rim; and further wherein the controller is configured to automatically adjust the speed and direction of the electric motor, without a manual throttle control, to reduce a difference between a pitch measured by the attitude sensing system and a zero pitch set point.

2. The vehicle of claim 1, further including a first user input device in electronic communication with the controller, the first user input device being operable by a user to provide a selectable attitude offset amount to the controller, wherein the controller is configured to adjust the zero pitch setpoint by the offset amount before comparing the adjusted setpoint to the measured pitch.

3. The vehicle of claim 2, wherein the first user input device comprises a two-pushbutton switch mounted to the handlebar, wherein a first of the two pushbuttons provides a positive amount of attitude offset and a second of the two pushbuttons provides a negative amount of attitude offset.

4. The vehicle of claim 2, wherein the selected attitude adjustment amount is retained in a nonvolatile memory for maintaining the adjusted zero pitch setpoint after cycling power to the controller.

5. The vehicle of claim 1, wherein the attitude sensing system comprises a pitch sensor configured to determine an up and down rotation of the vehicle about an axis parallel to the axis of rotation of the wheel, and a roll sensor configured to determine a side to side rotation of the vehicle about an axis parallel to a direction of vehicle travel.

6. The vehicle of claim 5, wherein the measured pitch corresponds to a pitch input received from the pitch sensor.

7. The vehicle of claim 6, wherein the controller is configured to compensate for a pitch error in the received pitch input based on a roll input received from the roll sensor.

8. The vehicle of claim 5, wherein the controller is configured to shut off power to the vehicle in response to a received roll input indicating that the vehicle has fallen over.

9. The vehicle of claim 1, further including a second user input device in electronic communication with the controller, the second user input device being operable by a user to provide a selectably variable braking input to the controller.

10. The vehicle of claim 9, wherein the controller is configured to slow the vehicle in response to receiving a braking input from the second user input device, using only a regenerative braking system.

11. The vehicle of claim 9, wherein the second user input device comprises a hand-operated brake lever mounted to the handlebar.

12. The vehicle of claim 1, wherein the vehicle is configured to convert between an operational mode in which the vehicle travels with only the single wheel assembly contacting a support surface and a parked mode in which the frame is rotated about the axis of the wheel such that the extension member contacts the support surface and resists lateral toppling of the vehicle.

* * * * *